(12) United States Patent
Hirayama et al.

(10) Patent No.: US 11,915,860 B2
(45) Date of Patent: Feb. 27, 2024

(54) LAMINATED CORE AND ELECTRIC MOTOR

(71) Applicant: NIPPON STEEL CORPORATION, Tokyo (JP)

(72) Inventors: Ryu Hirayama, Tokyo (JP); Kazutoshi Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 165 days.

(21) Appl. No.: 17/294,955

(22) PCT Filed: Dec. 17, 2019

(86) PCT No.: PCT/JP2019/049271
§ 371 (c)(1),
(2) Date: May 18, 2021

(87) PCT Pub. No.: WO2020/129928
PCT Pub. Date: Jun. 25, 2020

(65) Prior Publication Data
US 2022/0020530 A1    Jan. 20, 2022

(30) Foreign Application Priority Data

Dec. 17, 2018 (JP) .................................. 2018-235855

(51) Int. Cl.
*H01F 27/00* (2006.01)
*H01F 41/02* (2006.01)
(Continued)

(52) U.S. Cl.
CPC ....... *H01F 41/0233* (2013.01); *H01F 27/245* (2013.01); *H02K 1/18* (2013.01);
(Continued)

(58) Field of Classification Search
CPC .... H02K 15/022; H02K 15/024; H02K 1/146; H02K 1/16; H02K 1/18; H02K 2213/03;
(Continued)

(56) References Cited

U.S. PATENT DOCUMENTS 3,386,058 A   5/1968   Michel
4,025,379 A   5/1977   Whetstone
(Continued)

FOREIGN PATENT DOCUMENTS

CN   102792556 A   11/2012
EP     3553799 A1   10/2019
(Continued)

OTHER PUBLICATIONS

Matweb, "Plaskolite West Optix® CA -41 FDA General Purpose Acrylic Resin", 2 pages, retrieved online Dec. 19, 2022, www.matweb.mmlsearcthataSheet.aspx?MatGUID=ceec51c04t714fb383d01496424432d9. (Year: 2022).

(Continued)

*Primary Examiner* — Paul D Kim
(74) *Attorney, Agent, or Firm* — Renner, Otto, Boisselle & Sklar, LLP

(57) ABSTRACT

A laminated core includes a plurality of electrical steel sheets stacked on each other and coated with an insulation coating on both surfaces thereof, and an adhesion part provided between the electrical steel sheets adjacent to each other in a stacking direction and configured to adhere the electrical steel sheets to each other, wherein an adhesion area ratio of the electrical steel sheet by the adhesion part is 1% or more and 40% or less.

13 Claims, 15 Drawing Sheets

(51) Int. Cl.
*H01F 27/245* (2006.01)
*H02K 1/18* (2006.01)
*H01F 27/26* (2006.01)

(52) U.S. Cl.
CPC .......... *H01F 27/26* (2013.01); *H02K 2201/09* (2013.01); *H02K 2213/03* (2013.01)

(58) Field of Classification Search
CPC ... H02K 2201/09; H01F 41/0233; H01F 3/02; H01F 27/245; H01F 27/26
See application file for complete search history.

(56) References Cited

U.S. PATENT DOCUMENTS

| | | | |
|---|---|---|---|
| 4,103,195 | A | 7/1978 | Torossian |
| 4,413,406 | A | 11/1983 | Bennett |
| 5,142,178 | A | 8/1992 | Kloster et al. |
| 5,248,405 | A * | 9/1993 | Kaneda .................. C25D 11/38 205/302 |
| 5,338,996 | A | 8/1994 | Yamamoto |
| 5,448,119 | A | 9/1995 | Kono et al. |
| 5,994,464 | A | 11/1999 | Ohsawa et al. |
| 6,495,936 | B2 | 12/2002 | Kikuchi et al. |
| 6,653,758 | B2 | 11/2003 | Tsuneyoshi et al. |
| 7,298,064 | B2 | 11/2007 | Yamamoto |
| 7,562,439 | B2 | 7/2009 | Yamamoto |
| 7,859,163 | B2 | 12/2010 | Bertocchi et al. |
| 7,952,254 | B2 | 5/2011 | Cho et al. |
| 8,015,691 | B2 | 9/2011 | Miyake |
| 8,581,468 | B2 | 11/2013 | Kudose et al. |
| 8,697,811 | B2 | 4/2014 | Kishi et al. |
| 9,331,530 | B2 | 5/2016 | Jang et al. |
| 9,512,335 | B2 | 12/2016 | Hoshi et al. |
| 9,770,949 | B2 | 9/2017 | Fudemoto et al. |
| 10,340,754 | B2 * | 7/2019 | Ogino .................. H02K 1/18 |
| 10,348,170 | B2 | 7/2019 | Izumi et al. |
| 10,491,059 | B2 | 11/2019 | Murakami et al. |
| 10,547,225 | B2 | 1/2020 | Hattori et al. |
| 10,574,112 | B2 | 2/2020 | Tomonaga |
| 10,819,201 | B2 | 10/2020 | Thumm et al. |
| 10,840,749 | B2 | 11/2020 | Chaillou et al. |
| 11,056,934 | B2 | 7/2021 | Kubota et al. |
| 11,616,407 | B2 | 3/2023 | Hino et al. |
| 2002/0047459 | A1 | 4/2002 | Adaeda et al. |
| 2004/0056556 | A1 | 3/2004 | Fujita |
| 2004/0124733 | A1 | 7/2004 | Yamamoto et al. |
| 2006/0043820 | A1 | 3/2006 | Nakahara |
| 2007/0040467 | A1 | 2/2007 | Gu |
| 2007/0182268 | A1 | 8/2007 | Hashiba et al. |
| 2009/0026873 | A1 | 1/2009 | Matsuo et al. |
| 2009/0195110 | A1 | 8/2009 | Miyaki |
| 2009/0230812 | A1 | 9/2009 | Cho et al. |
| 2010/0090560 | A1 | 4/2010 | Myojin |
| 2010/0197830 | A1 | 8/2010 | Hayakawa et al. |
| 2010/0219714 | A1 | 9/2010 | Abe et al. |
| 2010/0244617 | A1 | 9/2010 | Nobata et al. |
| 2011/0180216 | A1 | 7/2011 | Miyake |
| 2011/0269894 | A1 | 11/2011 | Miyamoto |
| 2012/0088096 | A1 | 4/2012 | Takeda et al. |
| 2012/0128926 | A1 | 5/2012 | Ohishi et al. |
| 2012/0156441 | A1 | 6/2012 | Gerster |
| 2012/0235535 | A1 | 9/2012 | Watanabe |
| 2012/0288659 | A1 | 11/2012 | Hoshi et al. |
| 2013/0244029 | A1 | 9/2013 | Igarashi et al. |
| 2014/0023825 | A1 | 1/2014 | Igarashi et al. |
| 2015/0028717 | A1 | 1/2015 | Luo et al. |
| 2015/0097463 | A1 | 4/2015 | Blocher et al. |
| 2015/0130318 | A1 | 5/2015 | Kitada et al. |
| 2015/0256037 | A1 | 9/2015 | Kudose |
| 2015/0337106 | A1 | 11/2015 | Kajihara |
| 2016/0023447 | A1 | 1/2016 | Shimizu |
| 2016/0352165 | A1 | 12/2016 | Fubuki |
| 2017/0117758 | A1 | 4/2017 | Nakagawa |
| 2017/0287625 | A1 | 10/2017 | Ito |
| 2017/0342519 | A1 | 11/2017 | Uesaka et al. |
| 2018/0030292 | A1 | 2/2018 | Gotou |
| 2018/0056629 | A1† | 3/2018 | Hamamura |
| 2018/0159389 | A1 | 6/2018 | Nishikawa |
| 2018/0212482 | A1 | 7/2018 | Nigo |
| 2018/0295678 | A1* | 10/2018 | Okazaki ................ H05B 6/109 |
| 2018/0309330 | A1 | 10/2018 | Ueda |
| 2018/0342925 | A1 | 11/2018 | Horii et al. |
| 2019/0010361 | A1 | 1/2019 | Hoshi |
| 2019/0040183 | A1 | 2/2019 | Yoshida et al. |
| 2020/0048499 | A1 | 2/2020 | Andou et al. |
| 2020/0099263 | A1 | 3/2020 | Hirosawa et al. |
| 2020/0186014 | A1 | 6/2020 | Kusuyama |
| 2021/0296975 | A1 | 9/2021 | Hino et al. |

FOREIGN PATENT DOCUMENTS

| | | |
|---|---|---|
| EP | 3562006 A1 | 10/2019 |
| FR | 2803126 A1 | 6/2001 |
| JP | 56-065326 A | 6/1981 |
| JP | 57-006427 A | 1/1982 |
| JP | 60-170681 A | 9/1985 |
| JP | 60-186834 A | 12/1985 |
| JP | 60-186834 U | 12/1985 |
| JP | 63-207639 A | 8/1988 |
| JP | 03-124247 A | 5/1991 |
| JP | 03-247683 A | 11/1991 |
| JP | 04-028743 A | 3/1992 |
| JP | 04-028743 U | 3/1992 |
| JP | 07-118620 A | 5/1995 |
| JP | 07-298567 A | 11/1995 |
| JP | 08-259899 A | 10/1996 |
| JP | 11-162724 A | 6/1999 |
| JP | 2000-050539 A | 2/2000 |
| JP | 2000-152570 A | 5/2000 |
| JP | 2001-115125 A | 4/2001 |
| JP | 2002-078257 A | 3/2002 |
| JP | 2002-088107 A | 3/2002 |
| JP | 2002-105283 A | 4/2002 |
| JP | 2002-125341 A | 4/2002 |
| JP | 2002-151335 A | 5/2002 |
| JP | 2002-151339 A | 5/2002 |
| JP | 2002-164224 A | 6/2002 |
| JP | 2002-332320 A | 11/2002 |
| JP | 2003-199303 A | 7/2003 |
| JP | 2003-206464 A | 7/2003 |
| JP | 2003-219585 A | 7/2003 |
| JP | 2003-264962 A | 9/2003 |
| JP | 2003284274 A | 10/2003 |
| JP | 2004-088970 A | 3/2004 |
| JP | 2004-111509 A | 4/2004 |
| JP | 2004-150859 A | 5/2004 |
| JP | 2005-019642 A | 1/2005 |
| JP | 2005-268589 A | 9/2005 |
| JP | 2005-269732 A | 9/2005 |
| JP | 2006-254530 A | 9/2006 |
| JP | 2006-288114 A | 10/2006 |
| JP | 2006-353001 A | 12/2006 |
| JP | 2007015302 A | 1/2007 |
| JP | 2007-039721 A | 2/2007 |
| JP | 2008-067459 A | 3/2008 |
| JP | 4143090 B | 9/2008 |
| JP | 2009072035 A | 4/2009 |
| JP | 2009-177895 A | 8/2009 |
| JP | 2010-004716 A | 1/2010 |
| JP | 2010081659 A | 4/2010 |
| JP | 2010-220324 A | 9/2010 |
| JP | 2010-259158 A | 11/2010 |
| JP | 2011-023523 A | 2/2011 |
| JP | 2011-195735 A | 10/2011 |
| JP | 2012029494 A | 2/2012 |
| JP | 2012-061820 A | 3/2012 |
| JP | 2012060773 A | 3/2012 |
| JP | 2012-120299 A | 6/2012 |
| JP | 2012196100 A | 10/2012 |
| JP | 2013-089883 A | 5/2013 |
| JP | 2013089883 † | 5/2013 |
| JP | 2013-181101 A | 9/2013 |
| JP | 2013-253153 A | 12/2013 |

(56) References Cited

FOREIGN PATENT DOCUMENTS

| | | |
|---|---|---|
| JP | 2014-096429 A | 5/2014 |
| JP | 2014-155347 A | 8/2014 |
| JP | 2015-012756 A | 1/2015 |
| JP | 2015-082848 A | 4/2015 |
| JP | 2015-136228 A | 7/2015 |
| JP | 2015-142453 A | 8/2015 |
| JP | 2015-164389 A | 9/2015 |
| JP | 2015-171202 A | 9/2015 |
| JP | 2016-025317 A | 2/2016 |
| JP | 2016-046969 A | 4/2016 |
| JP | 2016-073109 A | 5/2016 |
| JP | 2016-140134 A | 8/2016 |
| JP | 2016-171652 A | 9/2016 |
| JP | 2016167907 A | 9/2016 |
| JP | 2017-005906 A | 1/2017 |
| JP | 2017-011863 A | 1/2017 |
| JP | 2017-028911 A | 2/2017 |
| JP | 2017-046442 A | 3/2017 |
| JP | 2017-075279 A | 4/2017 |
| JP | 2017-218596 A | 12/2017 |
| JP | 2018-038119 A | 3/2018 |
| JP | 2018-061319 A | 4/2018 |
| JP | 2018-078691 A | 5/2018 |
| JP | 2018-083930 A | 5/2018 |
| JP | 2018-093704 A | 6/2018 |
| JP | 2018-107852 A | 7/2018 |
| JP | 2018/138634 A | 9/2018 |
| JP | 2018-145492 A | 9/2018 |
| KR | 10-2018-0110157 A | 10/2018 |
| TW | 201809023 A | 3/2018 |
| WO | 2010/082482 A1 | 7/2010 |
| WO | 2011/013691 A1 | 2/2011 |
| WO | 2011/054065 A2 | 5/2011 |
| WO | 2014/102915 A1 | 7/2014 |
| WO | 2016017132 A1 | 2/2016 |
| WO | 2017/033229 A1 | 3/2017 |
| WO | WO-2017104479 A1 * | 6/2017 ............. C09J 11/04 |
| WO | 2017/170957 A | 10/2017 |
| WO | 2017/199527 A1 | 11/2017 |
| WO | 2018/043429 A1 | 3/2018 |
| WO | 2018/093130 A1 | 5/2018 |
| WO | 2018/105473 A1 | 6/2018 |
| WO | 2018/138864 A1 | 8/2018 |
| WO | 2018/207277 A1 | 11/2018 |
| WO | 2018/216565 A1 | 11/2018 |
| WO | 2020/129921 A1 | 6/2020 |
| WO | 2020/129923 A1 | 6/2020 |
| WO | 2020/129924 A1 | 6/2020 |
| WO | 2020/129925 A1 | 6/2020 |
| WO | 2020/129926 A1 | 6/2020 |
| WO | 2020/129927 A1 | 6/2020 |
| WO | 2020/129929 A1 | 6/2020 |
| WO | 2020/129935 A1 | 6/2020 |
| WO | 2020/129936 A1 | 6/2020 |
| WO | 2020/129937 A1 | 6/2020 |
| WO | 2020/129938 A1 | 6/2020 |
| WO | 2020/129940 A1 | 6/2020 |
| WO | 2020/129941 A1 | 6/2020 |
| WO | 2020/129942 A1 | 6/2020 |
| WO | 2020/129946 A1 | 6/2020 |
| WO | 2020/129948 A1 | 6/2020 |
| WO | 2020/129951 A1 | 6/2020 |

OTHER PUBLICATIONS

Japanese Industrial Standard (JIS) C 2552: 2014, relevance discussed in specification.
Japanese Industrial Standard (JIS) C 2553: 2012, relevance discussed in specification.
Japanese Industrial Standard (JIS) R 1602: 1995, relevance discussed in specification.
Japanese Industrial Standard (JIS) Z 2241: 2011.
Japanese Industrial Standard (JIS) K 7252-1:2016.
Japanese Industrial Standard (JIS) K 7121-1987.
Japanese Industrial Standard (JIS) K 6850: 1999.
The papers of technical meetings in the Institute of Electrical Engineers of Japan, RM-92-79, 1992.
Datasheet of Nylon 6, Cast (Year: N/A, Printed Jun. 28, 2023).

* cited by examiner
† cited by third party

LAMINATED CORE AND ELECTRIC MOTOR

TECHNICAL FIELD

The present invention relates to a laminated core and an electric motor.

Priority is claimed on Japanese Patent Application No. 2018-235855, filed Dec. 17, 2018, the content of which is incorporated herein by reference.

BACKGROUND ART

Conventionally, a laminated core as described in Patent Document 1 below is known. In this laminated core, electrical steel sheets adjacent to each other in a stacking direction are adhered.

CITATION LIST

Patent Document

[Patent Document 1]
Japanese Unexamined Patent Application, First Publication No. 2011-023523

SUMMARY OF THE INVENTION

Problems to be Solved by the Invention

There is room for improvement in enhancing magnetic properties of the conventional laminated core.

The present invention has been made in view of the above circumstances, and an object thereof is to enhance magnetic properties.

Means for Solving the Problem

In order to achieve the aforementioned object, the present invention proposes the following means.

(1) A first aspect of the present invention is a laminated core including a plurality of electrical steel sheets stacked on each other and coated with an insulation coating on both surfaces thereof, and an adhesion part provided between the electrical steel sheets adjacent to each other in a stacking direction and configured to adhere the electrical steel sheets to each other, wherein an adhesion area ratio of the electrical steel sheet by the adhesion part is 1% or more and 40% or less.

When electrical steel sheets adjacent to each other in the stacking direction are not fixed by some means, they may become relatively displaced. On the other hand, when electrical steel sheets adjacent to each other in the stacking direction are fixed by, for example, a fastening, the electrical steel sheets are greatly strained, and thus the magnetic properties of the laminated core are greatly affected.

In the laminated core according to the present invention, electrical steel sheets adjacent to each other in the stacking direction are adhered to each other by the adhesion parts. Therefore, it is possible to curb relative displacement between electrical steel sheets adjacent to each other in the stacking direction in the entire plurality of electrical steel sheets. Here, the adhesion area ratio of the electrical steel sheets by the adhesion part is 1% or more. Therefore, the adhesion of the electrical steel sheets by the adhesion part is ensured, and the relative displacement between the electrical steel sheets adjacent to each other in the stacking direction can be effectively restricted even when winding is performed into the slot of a laminated core, for example. Moreover, since a method of fixing the electrical steel sheets is not fixing by a fastening as described above but fixing by adhesion, strain generated in the electrical steel sheet can be curbed. Due to the above, the magnetic properties of the laminated core can be ensured.

Incidentally, compressive stress is generated in the electrical steel sheet as the adhesion part cures. Therefore, the electrical steel sheet may also be strained by the adhesion due to the adhesion part.

In the laminated core according to the present invention, the adhesion area ratio of the electrical steel sheet by the adhesion part is 40% or less. Therefore, the strain generated in the electrical steel sheet due to the adhesion part can be reduced to a low level. Therefore, better magnetic properties for the laminated core can be ensured.

(2) In the laminated core described in (1), the adhesion area ratio may be 1% or more and 20% or less.

The adhesion area ratio is 20% or less. Therefore, the strain generated in the electrical steel sheet due to the adhesion part can be further curbed.

(3) In the laminated core described in (1) or (2), the adhesion part may be provided along a peripheral edge of the electrical steel sheet.

The adhesion part is disposed along the peripheral edge of the electrical steel sheet. Therefore, for example, turning of the electrical steel sheets may be curbed. Thus, it is possible to easily apply a winding to the slot of the laminated core and to further ensure the magnetic properties of the laminated core.

(4) In the laminated core described in (3), a non-adhesion region of the electrical steel sheet in which the adhesion part is not provided may be formed between an adhesion region of the electrical steel sheet in which the adhesion part is provided and the peripheral edge of the electrical steel sheet.

(5) In the laminated core described in (4), the adhesion part may include a first adhesion part provided along an outer peripheral edge of the electrical steel sheet, and the non-adhesion region of the electrical steel sheet may be formed between the adhesion region of the electrical steel sheet in which the first adhesion part is provided and the outer peripheral edge of the electrical steel sheet.

(6) In the laminated core described in (4) or (5), the adhesion part may include a second adhesion part provided along an inner peripheral edge of the electrical steel sheet, and the non-adhesion region of the electrical steel sheet may be formed between the adhesion region of the electrical steel sheet in which the second adhesion part is provided and the inner peripheral edge of the electrical steel sheet.

The electrical steel sheet forming the laminated core is manufactured by punching an electrical steel sheet as a base material. During a punching process, strain due to the punching process is applied to a width corresponding to the plate thickness of the electrical steel sheet from the peripheral edge of the electrical steel sheet toward the inside of the electrical steel sheet. Since the peripheral edge of the electrical steel sheet is work-hardened by the strain, it is unlikely that the peripheral edge of the electrical steel sheet would be deformed and locally turned over. Thus, deformation of the electrical steel sheet is unlikely to occur even when adhesion to the peripheral edge of the electrical steel sheet is not performed. Therefore, even when the non-adhesion region is formed on the peripheral edge of the electrical steel sheet, the deformation of the electrical steel sheet can be curbed. It is possible to curb the application of unnecessary strain to the electrical steel sheet by forming the non-adhesion region in this way. Therefore, the magnetic properties of the laminated core can be further ensured.

(7) In the laminated core described in any one of (1) to (6), the electrical steel sheet may include an annular core back part and a plurality of tooth parts which protrude from the core back part in a radial direction of the core back part and are disposed at intervals in a circumferential direction of the core back part.

(8) In the laminated core described in (7), an adhesion area of the core back part by the adhesion part may be equal to or larger than an adhesion area of the tooth part by the adhesion part.

When a width (a size in the circumferential direction) of the tooth part is narrower than a width (a size in the radial direction) of the core back part, a magnetic flux is concentrated on the tooth part, and a magnetic flux density of the tooth part tends to increase. Therefore, when strain is applied to the electrical steel sheet by the adhesion part, and the strain is a uniform amount, an influence on the magnetic properties of the tooth part is greater than an influence on the magnetic properties of the core back part.

The adhesion area of the core back part by the adhesion part is equal to or larger than the adhesion area of the tooth part by the adhesion part. Therefore, it is possible to ensure the adhesion strength of the entire laminated core in the core back part while an influence on deterioration of the magnetic properties due to the strain of the adhesion part in the tooth part is curbed.

(9) In the laminated core described in (8), the electrical steel sheet may include an annular core back part and a plurality of tooth parts which protrude inward from the core back part in a radial direction of the core back part and are disposed at intervals in a circumferential direction of the core back part, the adhesion part may include a first adhesion part provided along an outer peripheral edge of the electrical steel sheet and a second adhesion part provided along an inner peripheral edge of the electrical steel sheet, a first ratio which is a ratio of a width of a portion of the first adhesion part provided along the outer peripheral edge of the core back part to a width of the core back part may be 33% or less, and a second ratio which is a ratio of a width of a portion of the second adhesion part provided along a side edge of the tooth part to a width of the tooth part may be 10% or less.

(10) In the laminated core described in (9), the first ratio may be 5% or more, and the second ratio may be 5% or more.

(11) In the laminated core described in (9) or (10), the first ratio may be equal to or greater than the second ratio.

The first ratio is 33% or less, and the second ratio is 10% or less. When both of the ratios are large, the adhesion area ratio becomes large. Therefore, the adhesion area ratio can be reduced to an appropriate value or less, for example, 40% or less by keeping both the ratios appropriately small.

Here, even when one of the first ratio and the second ratio is extremely high (for example, more than 50%), and the other is extremely low (for example, 0%), the adhesion area ratio itself may be curbed to an appropriate value or less. However, in this case, there is a likelihood that adhesion may be locally insufficient at the core back part or the tooth part.

On the other hand, in the laminated core, the first ratio and the second ratio are below a certain value, and one of the ratios is not extremely high. Therefore, it is possible to easily ensure the adhesion strength in each of the core back part and the tooth part while the adhesion area ratio is curbed to an appropriate value or less. For example, when both of the ratios are 5% or more, it is possible to easily ensure good adhesion strength in each of the core back part and the tooth part.

In general, the shape of the tooth part is restricted according to, for example, the number of poles and the number of slots. Thus, it is not easy to adjust the width of the tooth part. On the other hand, the above-described restriction does not occur in the core back part, and the width of the core back part can be easily adjusted. Moreover, the core back part needs to ensure strength for the laminated core. Therefore, the width of the core back part tends to be wide.

Due to the above, it can be said that the width of the core back part tends to be wider than the width of the tooth part. Therefore, the magnetic flux is widely dispersed in the core back part in the width direction, and the magnetic flux density in the core back part tends to be lower than the magnetic flux density in the tooth part. Therefore, even when strain occurs in the electrical steel sheet due to the adhesion part, and strain occurs in the core back part, the influence on the magnetic properties becomes smaller than that when strain occurs in the tooth part.

When the first ratio is equal to or greater than the second ratio, it can be said that the adhesion part is unevenly distributed in the core back part as compared with the tooth part. Here, as described above, when the strain occurs in the core back part, the influence on the magnetic properties is smaller than that when the stain occurs in the tooth part. Thus, the influence of the magnetic properties generated on the electrical steel sheet can be curbed to be small while the adhesion area ratio is ensured by setting the first ratio to be equal to or greater than the second ratio.

(12) In the laminated core described in any one of (1) to (11), an average thickness of the adhesion part may be 1.0 μm to 3.0 μm.

(13) In the laminated core described in any one of (1) to (12), an average tensile modulus of elasticity E of the adhesion part may be 1500 MPa to 4500 MPa.

(14) In the laminated core described in any one of (1) to (13), the adhesion part may be a room temperature adhesion type acrylic-based adhesive containing SGA made of an elastomer-containing acrylic-based adhesive.

(13) A second aspect of the present invention is an electric motor including the laminated core described in any one of (1) to (12).

Effects of the Invention

According to the present invention, it is possible to enhance magnetic properties.

EMBODIMENTS FOR IMPLEMENTING THE INVENTION

Hereinafter, an electric motor according to an embodiment of the present invention will be described with reference to the drawings. In the embodiment, a motor, specifically an AC motor, more specifically a synchronous motor, and even more specifically, a permanent magnetic electric motor will be exemplified as the electric motor. This type of motor is suitably adopted for, for example, an electric vehicle.

Figure 1:
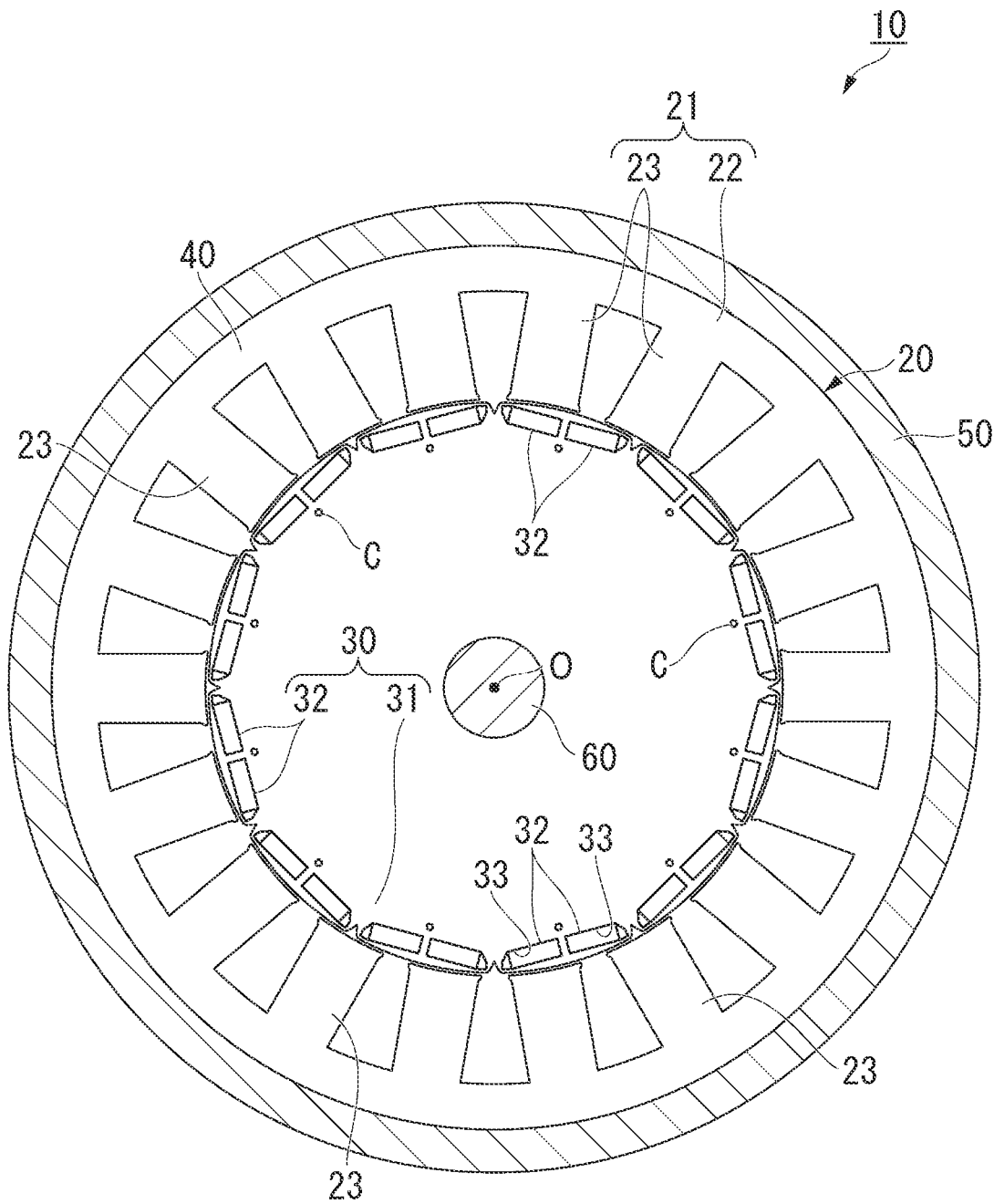
FIG. 1 is a cross-sectional view of an electric motor according to an embodiment of the present invention.
Figure 2:
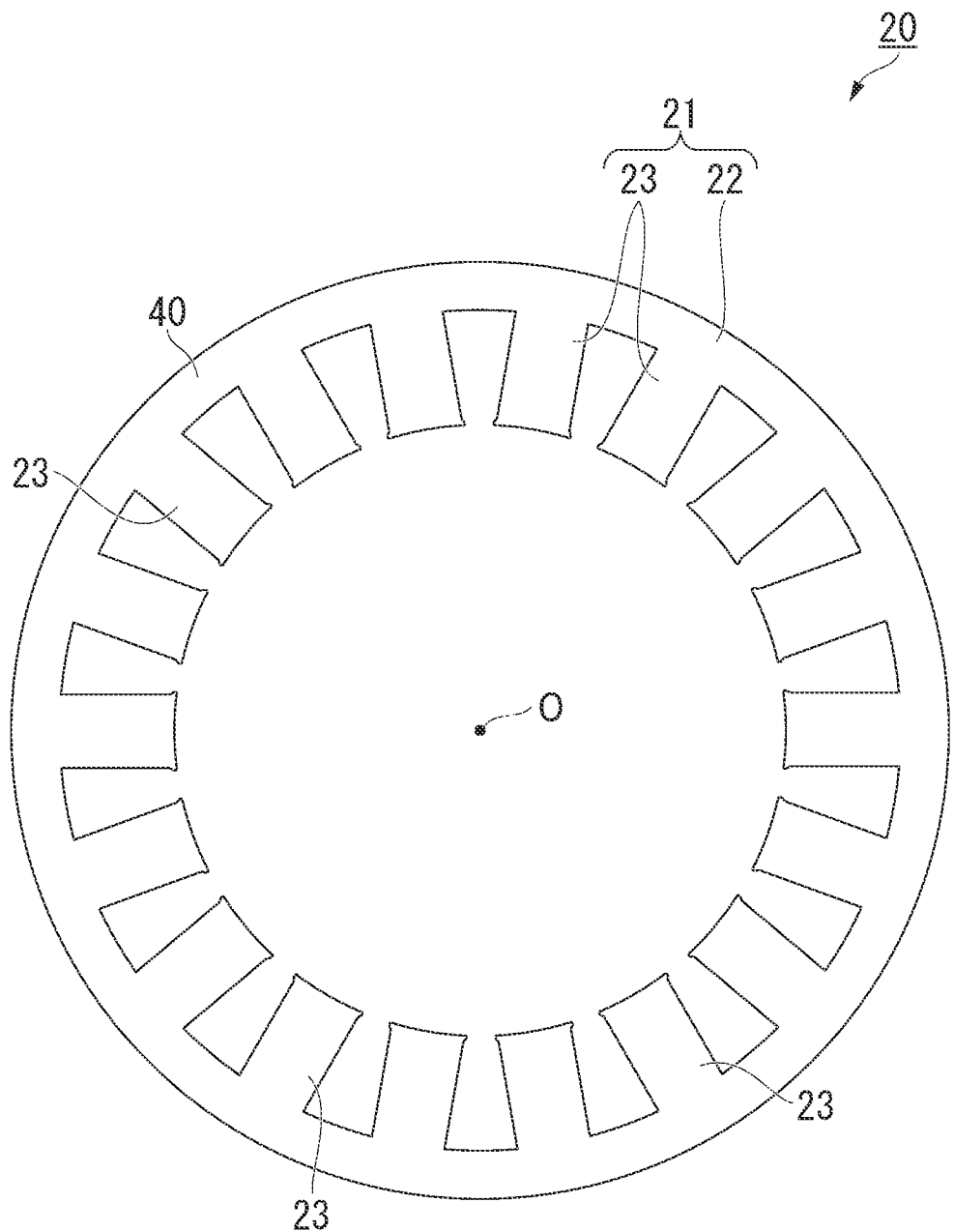
FIG. 2 is a plan view of a stator included in the electric motor shown in FIG. 1.

As shown in FIGS. 1 and 2, an electric motor 10 includes a stator 20, a rotor 30, a case 50, and a rotation shaft 60. The stator 20 and the rotor 30 are accommodated in the case 50. The stator 20 is fixed to the case 50.

In the present embodiment, as the electric motor 10, an inner rotor type in which the rotor 30 is located inside the stator 20 is adopted. However, as the electric motor 10, an outer rotor type in which the rotor 30 is located outside the stator 20 may be adopted. Further, in the present embodiment, the electric motor 10 is a 12-pole 18-slot three-phase AC motor. However, for example, the number of poles, the number of slots, the number of phases, and the like can be changed as appropriate. The electric motor 10 can rotate at a rotation speed of 1000 rpm by applying an excitation current having an effective value of 10 A and a frequency of 100 Hz to each of the phases, for example.

The stator 20 includes a stator core 21 and a winding (not shown).

The stator core 21 includes an annular core back part 22 and a plurality of tooth parts 23. In the following, an axial direction (a direction of a central axis O of the stator core 21) of the stator core 21 (the core back part 22) is referred to as an axial direction, a radial direction (a direction orthogonal to the central axis O of the stator core 21) of the stator core 21 (the core back part 22) is referred to as a radial direction, and a circumferential direction (a direction of rotation around the central axis O of the stator core 21) of the stator core 21 (the core back part 22) is referred to as a circumferential direction.

The core back part 22 is formed in an annular shape in a plan view of the stator 20 when seen in the axial direction.

The plurality of tooth parts 23 protrude from the core back part 22 inward in the radial direction (toward the central axis O of the core back part 22 in the radial direction). The plurality of tooth parts 23 are disposed at equal intervals in the circumferential direction. In the present embodiment, 18 tooth parts 23 are provided at an interval of 20 degrees of a central angle centered on the central axis O. The plurality of tooth parts 23 are formed to have the same shape and the same size as each other.

The winding is wound around the tooth part 23. The winding may be a concentrated winding or a distributed winding.

The rotor 30 is disposed inside the stator 20 (the stator core 21) in the radial direction. The rotor 30 includes a rotor core 31 and a plurality of permanent magnets 32.

The rotor core 31 is formed in an annular shape (an annular ring) disposed coaxially with the stator 20. The rotation shaft 60 is disposed in the rotor core 31. The rotation shaft 60 is fixed to the rotor core 31.

The plurality of permanent magnets 32 are fixed to the rotor core 31. In the present embodiment, a set of two permanent magnets 32 forms one magnetic pole. The plurality of sets of permanent magnets 32 are disposed at equal intervals in the circumferential direction. In the present embodiment, 12 sets of (24 in total) permanent magnets 32 are provided at an interval of 30 degrees of the central angle centered on the central axis O.

In the present embodiment, an interior permanent magnet motor is adopted as a permanent magnetic electric motor. A plurality of through-holes 33 which pass through the rotor core 31 in the axial direction are formed in the rotor core 31. The plurality of through-holes 33 are provided corresponding to the plurality of permanent magnets 32. Each of the permanent magnets 32 is fixed to the rotor core 31 in a state in which it is disposed in the corresponding through-hole 33. Fixing of each of the permanent magnets 32 to the rotor core 31 can be realized, for example, by adhering an outer surface of the permanent magnet 32 and an inner surface of the through-hole 33 with an adhesive or the like. As the permanent magnetic electric motor, a surface permanent magnet motor may be adopted instead of the interior permanent magnet motor.

Both the stator core 21 and the rotor core 31 are laminated cores. The laminated core is formed by stacking a plurality of electrical steel sheets 40.

A stacking thickness of each of the stator core 21 and the rotor core 31 is, for example, 50.0 mm. An outer diameter of the stator core 21 is, for example, 250.0 mm. An inner diameter of the stator core 21 is, for example, 165.0 mm. An outer diameter of the rotor core 31 is, for example, 163.0 mm. An inner diameter of the rotor core 31 is, for example, 30.0 mm. However, these values are examples, and the stacking thickness, the outer diameter and the inner diameter of the stator core 21, and the stacking thickness, the outer diameter and the inner diameter of the rotor core 31 are not limited to these values. Here, the inner diameter of the stator core 21 is based on a tip end portion of the tooth part 23 of the stator core 21. The inner diameter of the stator core 21 is a diameter of a virtual circle inscribed in the tip end portions of all the tooth parts 23.

Each of the electrical steel sheets 40 forming the stator core 21 and the rotor core 31 is formed, for example, by punching an electrical steel sheet as a base material. As the electrical steel sheet 40, a known electrical steel sheet can be used. A chemical composition of the electrical steel sheet 40 is not particularly limited. In the present embodiment, a non-grain-oriented electrical steel sheet is adopted as the electrical steel sheet 40. As the non-grain-oriented electrical steel sheet, for example, a non-grain-oriented electrical steel strip of JIS C 2552:2014 can be adopted. However, as the electrical steel sheet 40, it is also possible to adopt a grain-oriented electrical steel sheet instead of the non-grain-oriented electrical steel sheet. As the grain-oriented electrical steel sheet, for example, a grain-oriented electrical steel strip of JIS C 2553:2012 can be adopted.

Insulation coatings are provided on both surfaces of the electrical steel sheet 40 in order to improve workability of the electrical steel sheet and iron loss of the laminated core. For example, (1) an inorganic compound, (2) an organic resin, (3) a mixture of an inorganic compound and an organic resin, and the like can be applied as a substance constituting the insulation coating. Examples of the inorganic compound include (1) a complex of dichromate and boric acid, (2) a complex of phosphate and silica, and the like. Examples of the organic resin include an epoxy-based resin, an acrylic-based resin, an acrylic-styrene-based resin, a polyester-based resin, a silicone-based resin, a fluorine-based resin, and the like.

In order to ensure insulating performance between the electrical steel sheets 40 stacked with each other, a thickness of the insulation coating (a thickness per one surface of the electrical steel sheet 40) is preferably 0.1 μm or more.

On the other hand, an insulating effect saturates as the insulation coating becomes thicker. Further, as the insulation coating becomes thicker, a space factor decreases, and the performance as a laminated core deteriorates. Therefore, the insulation coating should be as thin as possible within a range in which the insulating performance is ensured. The thickness of the insulation coating (the thickness per one surface of the electrical steel sheet 40) is preferably 0.1 μm or more and 5 μm or less, and more preferably 0.1 μm or more and 2 μm or less.

As the electrical steel sheet 40 becomes thinner, an effect of improving the iron loss gradually saturates. Further, as the electrical steel sheet 40 becomes thinner, manufacturing cost of the electrical steel sheet 40 increases. Therefore, the thickness of the electrical steel sheet 40 is preferably 0.10 mm or more in consideration of the effect of improving the iron loss and the manufacturing cost.

On the other hand, when the electrical steel sheet 40 is too thick, a press punching operation of the electrical steel sheet 40 becomes difficult. Therefore, when considering the press punching operation of the electrical steel sheet 40, the thickness of the electrical steel sheet 40 is preferably 0.65 mm or less.

Further, as the electrical steel sheet 40 becomes thicker, the iron loss increases. Therefore, when considering iron loss characteristics of the electrical steel sheet 40, the thickness of the electrical steel sheet 40 is preferably 0.35 mm or less, more preferably 0.20 mm or 0.25 mm.

In consideration of the above points, the thickness of each of the electrical steel sheets 40 is, for example, 0.10 mm or more and 0.65 mm or less, preferably 0.10 mm or more and 0.35 mm or less and more preferably 0.20 mm or 0.25 mm.

The thickness of the electrical steel sheet 40 includes the thickness of the insulation coating.

The plurality of electrical steel sheets 40 forming the stator core 21 are adhered by an adhesion part 41. The adhesion part 41 is an adhesive which is provided between the electrical steel sheets 40 adjacent to each other in a stacking direction and is cured without being divided. As the adhesive, for example, a thermosetting adhesive by polymer bonding is used. As a composition of the adhesive, (1) an acrylic-based resin, (2) an epoxy-based resin, (3) a composition containing the acrylic-based resin and the epoxy-based resin, and the like can be applied. As such an adhesive, a radical polymerization type adhesive or the like can be used in addition to the thermosetting adhesive, and from the viewpoint of productivity, it is desirable to use a room temperature curing type adhesive. The room temperature curing type adhesive cures at 20° C. to 30° C. As the room temperature curing type adhesive, an acrylic-based adhesive is preferable. Typical acrylic-based adhesives include a second generation acrylic-based adhesive (SGA) and the like. An anaerobic adhesive, an instant adhesive, and an elastomer-containing acrylic-based adhesive can be used as long as the effects of the present invention are not impaired. The adhesive referred to here refers to a state before curing and becomes an adhesion part 41 after the adhesive is cured.

An average tensile modulus of elasticity E of the adhesion part 41 at room temperature (20° C. to 30° C.) is in a range of 1500 MPa to 4500 MPa. When the average tensile modulus of elasticity E of the adhesion part 41 is less than 1500 MPa, there is a problem that a rigidity of the laminated core is lowered. Therefore, a lower limit of the average tensile modulus of elasticity E of the adhesion part 41 is 1500 MPa, more preferably 1800 MPa. On the contrary, when the average tensile modulus of elasticity E of the adhesion part 41 exceeds 4500 MPa, there is a problem that the insulation coating formed on the surface of the electrical steel sheet 40 is peeled off. Therefore, an upper limit of the average tensile modulus of elasticity E of the adhesion part 41 is 4500 MPa, and more preferably 3650 MPa.

The average tensile modulus of elasticity E is measured by a resonance method. Specifically, the tensile modulus of elasticity is measured based on JIS R 1602:1995.

More specifically, first, a sample for measurement (not shown) is produced. This sample is obtained by adhering two electrical steel sheets 40 with an adhesive to be measured and curing the adhesive to form the adhesion part 41. When the adhesive is a thermosetting type, the curing is performed by heating and pressurizing under heating and pressurizing conditions in an actual operation. On the other hand, when the adhesive is a room temperature curing type, it is performed by pressurizing at room temperature.

Then, the tensile modulus of elasticity of this sample is measured by the resonance method. As described above, a method for measuring the tensile modulus of elasticity by the resonance method is performed based on JIS R 1602:1995. After that, the tensile modulus of elasticity of the adhesion part 41 alone can be obtained by removing an influence of the electrical steel sheet 40 itself from the tensile modulus of elasticity (a measured value) of the sample by calculation.

Since the tensile modulus of elasticity obtained from the sample in this way is equal to an average value of all the laminated cores, this value is regarded as the average tensile modulus of elasticity E. The composition is set so that the average tensile modulus of elasticity E hardly changes at a stacking position in the stacking direction or at a circumferential position around an axial direction of the laminated core. Therefore, the average tensile modulus of elasticity E can be set to a value obtained by measuring the cured adhesion part 41 at an upper end position of the laminated core.

As the adhering method, for example, a method in which an adhesive is applied to the electrical steel sheet 40 and then adhered by one of heating and press-stacking, or both of them can be adopted. A heating unit may be any one of heating in a high temperature bath or an electric furnace, a method of directly energizing, and the like.

In order to obtain stable and sufficient adhesion strength, the thickness of the adhesion part 41 is preferably 1 μm or more.

On the other hand, when the thickness of the adhesion part 41 exceeds 100 μm, an adhesion force is saturated. Further, as the adhesion part 41 becomes thicker, the space factor decreases, and the magnetic properties such as iron loss of the laminated core decrease. Therefore, the thickness of the adhesion part 41 is preferably 1 μm or more and 100 μm or less, and more preferably 1 μm or more and 10 μm or less. In the above description, the thickness of the adhesion part 41 means an average thickness of the adhesion part 41.

The average thickness of the adhesion part 41 is more preferably 1.0 μm or more and 3.0 μm or less. When the average thickness of the adhesion part 41 is less than 1.0 μm, sufficient adhesion force cannot be ensured as described above. Therefore, a lower limit of the average thickness of the adhesion part 41 is 1.0 μm, and more preferably 1.2 μm. On the contrary, when the average thickness of the adhesion part 41 becomes thicker than 3.0 μm, problems such as a large increase in a strain amount of the electrical steel sheet 40 due to a shrinkage during thermosetting occur. Therefore, an upper limit of the average thickness of the adhesion part 41 is 3.0 μm, and more preferably 2.6 μm. The average thickness of the adhesion part 41 is an average value of all the laminated cores. An average thickness of the adhesion part 41 hardly changes at the stacking position in the stacking direction and a circumferential position around the central axis of the laminated core. Therefore, the average thickness of the adhesion part 41 can be set as an average value of numerical values measured at 10 or more points in the circumferential direction at an upper end position of the laminated core.

The average thickness of the adhesion part 41 can be adjusted, for example, by changing an amount of adhesive applied. Further, in the case of the thermosetting adhesive, the average tensile modulus of elasticity E of the adhesion part 41 may be adjusted, for example, by changing one or both of heating and pressurizing conditions applied at the time of adhesion and a type of curing agent.

In the present embodiment, the plurality of electrical steel sheets 40 forming the rotor core 31 are fixed to each other by a fastening C (dowels). However, the plurality of electrical steel sheets 40 forming the rotor core 31 may be adhered to each other by the adhesion part 41.

The laminated cores such as the stator core 21 and the rotor core 31 may be formed by so-called turn-stacking.

Figure 3:
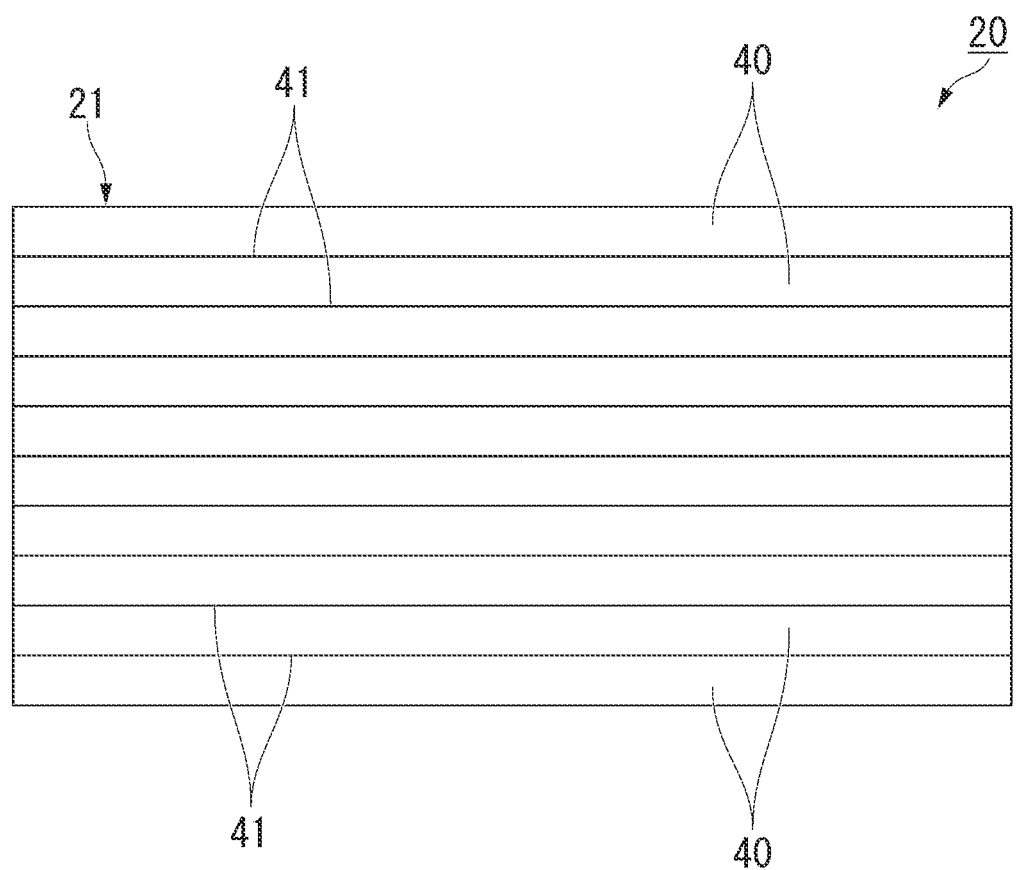
FIG. 3 is a side view of the stator included in the electric motor shown in FIG. 1.
Figure 4:
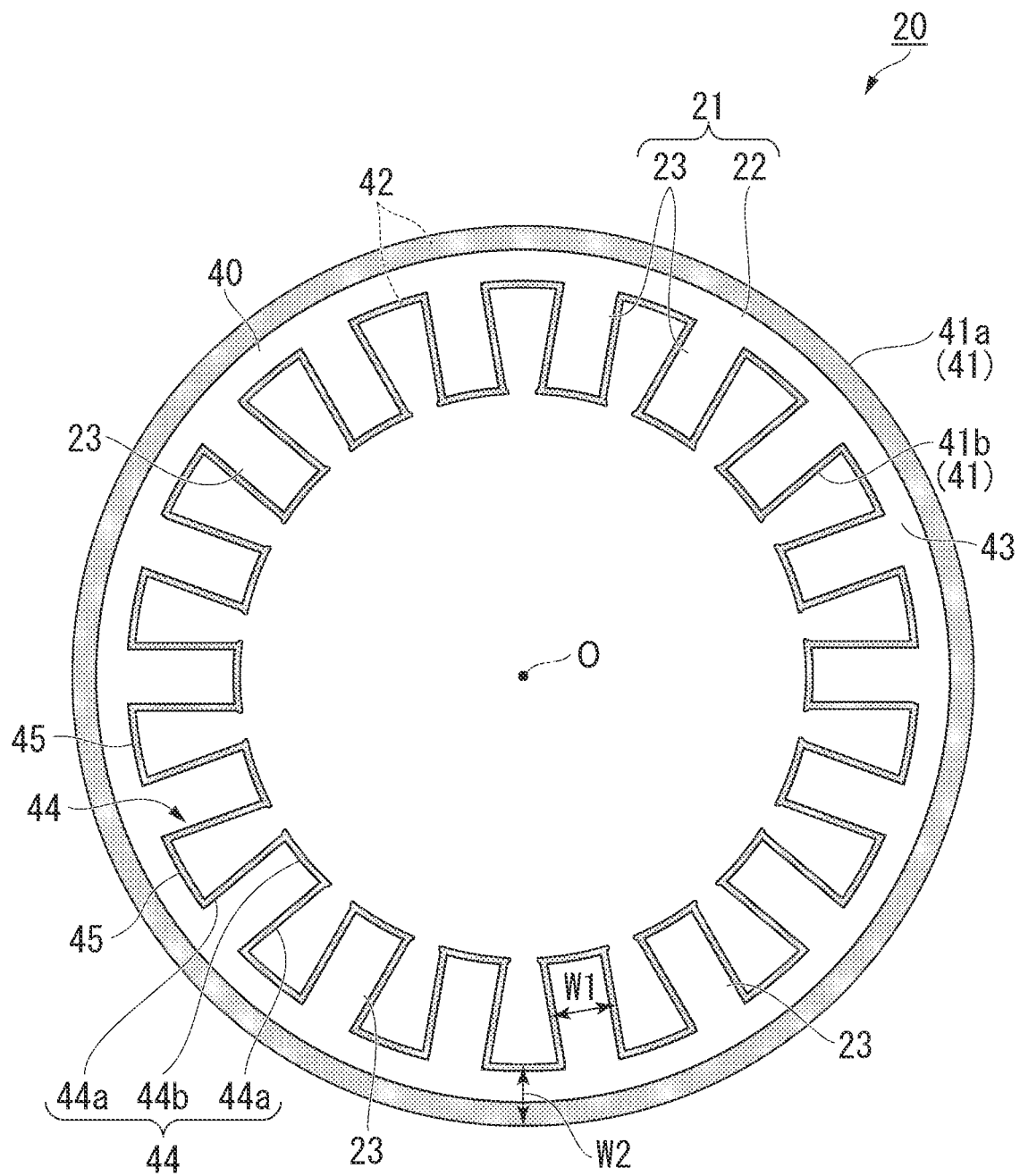
FIG. 4 is a plan view of an electrical steel sheet and an adhesion part of the stator included in the electric motor shown in FIG. 1.

Here, as shown in FIGS. 3 and 4, in the present embodiment, the electrical steel sheets 40 adjacent to each other in the stacking direction are adhered to each other by the adhesion part 41. In the illustrated example, the electrical steel sheets 40 adjacent to each other in the stacking direction are fixed only by adhesion, and are not fixed by other methods (for example, fastening or the like).

As shown in FIG. 4, the electrical steel sheets 40 adjacent to each other in the stacking direction are not adhered to each other over the entire surfaces thereof. These electrical steel sheets 40 are locally adhered to each other.

In the present embodiment, the electrical steel sheets 40 adjacent to each other in the stacking direction are adhered to each other by the adhesion part 41 provided along a peripheral edge of the electrical steel sheet 40. Specifically, the electrical steel sheets 40 adjacent to each other in the stacking direction are adhered to each other by a first adhesion part 41a and a second adhesion part 41b. The first adhesion part 41a is provided along an outer peripheral edge of the electrical steel sheet 40 in a plan view of the electrical steel sheet 40 when seen in the stacking direction. The second adhesion part 41b is provided along an inner peripheral edge of the electrical steel sheet 40 in a plan view of the electrical steel sheet 40 when seen in the stacking direction. Each of the first and second adhesion parts 41a and 41b is formed in a strip shape in a plan view.

Here, the strip shape also includes a shape in which a width of the strip changes in the middle. For example, a shape in which round points are continuous in one direction without being divided is also included in a strip shape which extends in one direction. However, the fact that the adhesion part 41 is along the peripheral edge does not presuppose a shape in which the adhesion part 41 is continuous in one direction. For example, a case in which a plurality of adhesion parts 41 are intermittently disposed in one direction is also included. However, in this case, preferably, a distance (a length in one direction) between a pair of adhesion parts 41 adjacent to each other in one direction is large, and a size of each of the pair of adhesion parts 41 (a length in one direction) is also large.

Further, the fact that the adhesion part 41 is along the peripheral edge includes not only a case in which the adhesion part 41 is provided without a gap from the peripheral edge, but also a case in which the adhesion part 41 is provided with a gap with respect to the peripheral edge of the electrical steel sheet 40. In this case, the fact that the adhesion part 41 is along the peripheral edge means that the adhesion part 41 extends substantially parallel to a target peripheral edge. In other words, the fact that the adhesion part 41 is along the peripheral edge includes not only a case in which the adhesion part 41 is completely parallel to the peripheral edge but also a case in which the adhesion part 41 has an inclination of, for example, 5 degrees or less with respect to the peripheral edge.

The first adhesion part 41a is disposed along the outer peripheral edge of the electrical steel sheet 40. The first adhesion part 41a extends continuously over the entire circumference in the circumferential direction. The first adhesion part 41a is formed in an annular shape in a plan view of the first adhesion part 41a when seen in the stacking direction.

The second adhesion part 41b is disposed along the inner peripheral edge of the electrical steel sheet 40. The second adhesion part 41b extends continuously over the entire circumference in the circumferential direction.

The second adhesion part 41b includes a plurality of tooth parts 44 and a plurality of core back parts 45. The plurality of tooth parts 44 are provided at intervals in the circumferential direction, and are respectively disposed in the tooth parts 23. The plurality of core back parts 45 are disposed in the core back part 22, and connect the tooth parts 44 adjacent to each other in the circumferential direction.

The tooth part 44 includes a pair of first parts 44a and a second part 44b. The first parts 44a are disposed at an interval in the circumferential direction. The first parts 44a extend along the radial direction. Each of the first parts 44a extends in a strip shape in the radial direction. The second part 44b connects the pair of first parts 44a to each other in the circumferential direction. The second part 44b extends in a strip shape in the circumferential direction.

Figure 5:
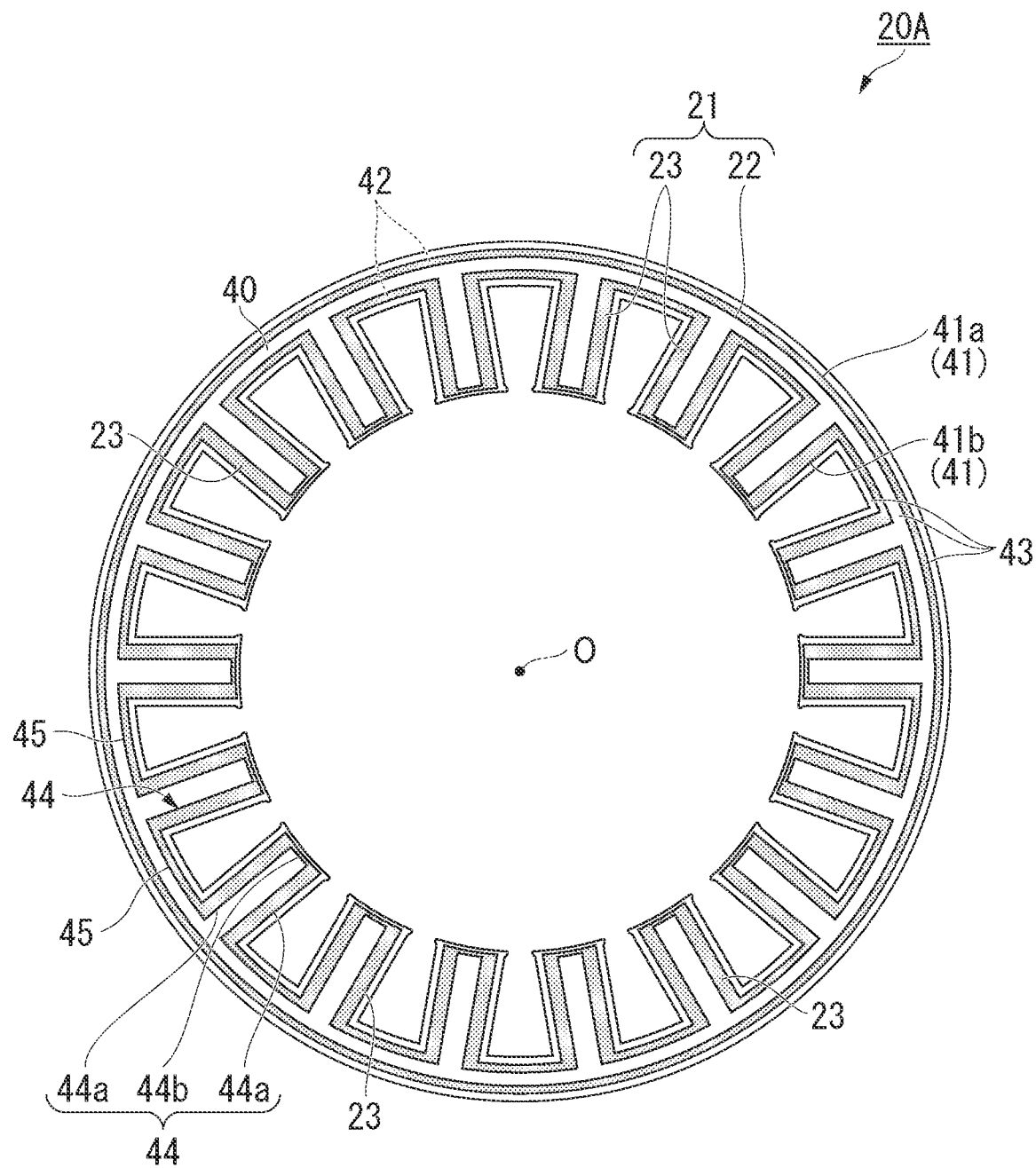
FIG. 5 is a plan view of an electrical steel sheet and an adhesion part of a stator included in an electric motor according to a first modified example of the electric motor shown in FIG. 1.

In the present embodiment, in a plan view of the electrical steel sheet 40, the adhesion part 41 is provided without a gap from the peripheral edge of the electrical steel sheet 40, but the present invention is not limited thereto. For example, as in a stator 20A according to a first modified example shown in FIG. 5, in the plan view of the electrical steel sheet 40, the adhesion part 41 may be provided with a gap with respect to the peripheral edge of the electrical steel sheet 40. That is, a non-adhesion region 43 of the electrical steel sheet 40 in which the adhesion part 41 is not provided may be formed between an adhesion region 42 of the electrical steel sheet 40 in which the adhesion part 41 is provided and the peripheral edge of the electrical steel sheet 40. The adhesion region 42 of the electrical steel sheet 40 in which the adhesion part 41 is provided means an region of a surface of the electrical steel sheet 40 facing the stacking direction (hereinafter, referred to as a first surface of the electrical steel sheet 40) on which the adhesive cured without being divided is provided. The non-adhesion region 43 of the electrical steel sheet 40 in which the adhesion part 41 is not provided means a region of the first surface of the electrical steel sheet 40 in which the adhesive cured without being divided is not provided.

Here, the fact that the adhesion part 41 is along the peripheral edge does not include a case in which the adhesion part 41 is provided with a gap exceeding a certain width with respect to the peripheral edge of the electrical steel sheet 40. Specifically, the adhesion part 41 is provided within a range, which does not exceed three times the size corresponding to the plate thickness of the electrical steel sheet 40, from the peripheral edge of the electrical steel sheet 40. A distance (a width) between the adhesion part 41 and the peripheral edge of the electrical steel sheet 40 is preferably not more than the plate thickness of the electrical steel sheet 40, and may be 3 times or less the plate thickness. When the distance is zero, the adhesion part 41 is provided on the peripheral edge of the electrical steel sheet 40 without any gap.

In the present embodiment, the shapes of all the adhesion parts 41 provided between the electrical steel sheets 40 in a plan view are the same. The shape of the adhesion part 41 in the plan view means an overall shape of the adhesion part 41 in a plan view of the electrical steel sheet 40 in which the adhesion part 41 is provided when seen in the stacking direction. The fact that all the adhesion parts 41 provided between the electrical steel sheets 40 have the same shape in the plan view include not only a case in which all the adhesion parts 41 provided between the electrical steel sheets 40 have completely the same shape in the plan view, but also a case in which they have substantially the same shape. The case in which they have substantially the same shape is a case in which all the adhesion parts 41 provided between the electrical steel sheets 40 have a common shape of 95% or more in the plan view.

In the present embodiment, an adhesion area ratio of the electrical steel sheet 40 by the adhesion part 41 is 1% or more and 40% or less. In the illustrated example, the adhesion area ratio is 1% or more and 20% or less, and is specifically 20%. The adhesion area ratio of the electrical steel sheet 40 by the adhesion part 41 is a ratio of an area of a region (the adhesion region 42) in the first surface in which the adhesion part 41 is provided to an area of the first surface of the electrical steel sheet 40. The region in which the adhesion part 41 is provided is a region (the adhesion region 42) of the first surface of the electrical steel sheet 40 in which the adhesive cured without being divided is provided. The area of the region in which the adhesion part 41 is provided can be obtained, for example, by photographing the first surface of the electrical steel sheet 40 after peeling and image-analyzing the photography results.

In the present embodiment, the adhesion area ratio of the electrical steel sheet 40 by the adhesion part 41 between the electrical steel sheets 40 is 1% or more and 20% or less. In both the electrical steel sheets 40 adjacent to each other in the stacking direction, the adhesion area ratio of the electrical steel sheets 40 by the adhesion part 41 is 1% or more and 20% or less. When the adhesion parts 41 are provided on both sides of one electrical steel sheet 40 in the stacking direction, the adhesion area ratios on both sides of the electrical steel sheet 40 are 1% or more and 20% or less.

It is possible to easily ensure an adhesion area (a bonded area) by adhering the electrical steel sheet 40 with the adhesion part 41, as compared with a case in which the electrical steel sheet 40 is fastened.

Further, in the present embodiment, the adhesion area of the core back part 22 by the adhesion part 41 (hereinafter, referred to as a "first adhesion area S1") is equal to or larger than an adhesion area of the tooth part 23 by the adhesion part 41 (hereinafter, referred to as a "second adhesion area S2"). That is, $S1 \geq S2$.

Here, the first adhesion area S1 is a region of the core back part 22 on the first surface of the electrical steel sheet 40 in which the adhesive cured without being divided is provided. The second adhesion area S2 is a region of the tooth part 23 on the first surface of the electrical steel sheet 40 in which the adhesive cured without being divided is provided. Similar to the area of the region in which the adhesion part 41 is provided, the first adhesion area S1 and the second adhesion area S2 are obtained, for example, by photographing the first surface of the electrical steel sheet 40 after peeling and image-analyzing the photographed results.

An adhesion area of the electrical steel sheet 40 by the first adhesion part 41a is S11. In the second adhesion part 41b, the adhesion area of the electrical steel sheet 40 by the core back part 45 is S12a. In the second adhesion part 41b, the adhesion area of the electrical steel sheet 40 by the tooth part 44 is S12b. The adhesion area of the electrical steel sheet 40 by the first adhesion part 41a is an area of a region on the first surface of the electrical steel sheet 40 in which the first adhesion part 41a is provided. In the second adhesion part 41b, the adhesion area of the electrical steel sheet 40 by the core back part 45 is an area of a region on the core back part 45 of the first surface of the electrical steel sheet 40 in which the second adhesion part 41b is provided. In the second adhesion part 41b, the adhesion area of the electrical steel sheet 40 by the tooth part 44 is an area of a region of the tooth part 44 on the first surface of the electrical steel sheet 40 in which the second adhesion part 41b is provided.

When the above-described S11, S12a and S12b are used, S1 and S2 are represented by the following equations.

$$S1 = S11 + S12a$$

$$S2 = S12b$$

Moreover, in the present embodiment, the adhesion area of the electrical steel sheet 40 by the first adhesion part 41a is equal to or larger than the adhesion area of the electrical steel sheet 40 by the second adhesion part 41b. That is, $S11 \geq S12a + S12b$. As a precondition in this case, for example, one or both of the following (1) and (2) can be mentioned. (1) A length of a strip formed by the first adhesion part 41*a* is longer than a length of a strip formed by the second adhesion part 41*b*. (2) A width of the strip formed by the first adhesion part 41*a* is wider than a width of the strip formed by the second adhesion part 41*b*.

In the stator core 21, when the electrical steel sheets 40 adjacent to each other in the stacking direction are not fixed by some means, they are relatively displaced. On the other hand, when the electrical steel sheets 40 adjacent to each other in the stacking direction are fixed by, for example, a fastening, the electrical steel sheets 40 are greatly strained, and thus the magnetic properties of the stator core 21 are greatly affected.

On the other hand, in the stator core 21 according to the present embodiment, the electrical steel sheets 40 adjacent to each other in the stacking direction are adhered to each other by the adhesion part 41. Therefore, it is possible to curb the relative displacement between the electrical steel sheets 40 adjacent to each other in the stacking direction in the entire plurality of electrical steel sheets 40. Here, the adhesion area ratio of the electrical steel sheet 40 by the adhesion part 41 is 1% or more. Therefore, the adhesion by the adhesion part 41 is ensured, and the relative displacement between the electrical steel sheets 40 adjacent to each other in the stacking direction can be effectively restricted even when a winding is performed into the slot of the stator core 21, for example. Moreover, since a method of fixing the electrical steel sheets 40 is not fixing by a fastening as described above but fixing by adhesion, the strain generated in the electrical steel sheet 40 can be curbed. Due to the above, the magnetic properties of the stator core 21 can be ensured.

Incidentally, when an adhesive is applied to the electrical steel sheet 40, compressive stress is generated in the electrical steel sheet 40 as the adhesive cures. Therefore, when the adhesion part 41 is formed by applying the adhesive to the electrical steel sheet 40, the electrical steel sheet 40 may be strained.

However, in the stator core 21 according to the present embodiment, the adhesion area ratio of the electrical steel sheet 40 by the adhesion part 41 is 40% or less. Therefore, the strain generated in the electrical steel sheet 40 due to the adhesive can be curbed to be low. Therefore, the magnetic properties of the stator core 21 can be further ensured.

Moreover, the adhesion area ratio of the electrical steel sheet 40 by the adhesion part 41 is 20% or less. Therefore, the strain generated in the electrical steel sheet 40 due to the adhesive can be further curbed.

The adhesion part 41 is provided on the adhesion region 42 formed along the peripheral edge of the electrical steel sheet 40. Therefore, for example, it is possible to curb turning of the electrical steel sheets 40 adjacent to each other in the stacking direction. Thus, it is possible to easily apply a winding to the slot of the stator core 21 and to further ensure the magnetic properties of the stator core 21. Therefore, the magnetic properties of the stator core 21 can be further ensured.

When a width W1 (a size in the circumferential direction) of the tooth part 23 is narrower than a width W2 (a size in the radial direction) of the core back part 22, a magnetic flux is concentrated on the tooth part 23, and a magnetic flux density of the tooth part 23 tends to increase. Therefore, when strain is applied to the steel sheet by the adhesive, and the strain is an uniform amount, an influence on the magnetic properties of the tooth part 23 is greater than on the magnetic properties of the core back part 22.

The first adhesion area S1 is equal to or larger than the second adhesion area S2. Therefore, it is possible to ensure the adhesion strength of the entire stator core 21 in the core back part 22 while the influence on deterioration of the magnetic properties due to the strain of the adhesive in the tooth part 23 is curbed.

Here, as long as the adhesion area ratio of the electrical steel sheet 40 by the adhesion part 41 is 1% or more and 40% or less, the form of the second adhesion part 41*b* is not limited to the form shown in the above-described embodiment. For example, the second part 44*b* of the tooth part 44 may be omitted. In this case, the influence of deterioration of the magnetic properties due to the strain of the adhesive in the second part 44*b* of the tooth part 23 in which the magnetic flux density becomes high can be remarkably curbed. In this case, for example, the adhesion area ratio of the entire electrical steel sheet 40 may be ensured by increasing the adhesion area ratio by the first adhesion part 41*a*.

The electrical steel sheet 40 forming the stator core 21 is manufactured by punching an electrical steel sheet as a base material. During a punching process, strain due to the punching process is applied to a width corresponding to the plate thickness of the electrical steel sheet 40 from the peripheral edge of the electrical steel sheet 40 toward the inside of the electrical steel sheet 40 (here, the inside of the electrical steel sheet 40 is a region between the outer peripheral edge and the inner peripheral edge of the electrical steel sheet 40). Since the peripheral edge of the electrical steel sheet 40 is work-hardened by the strain, it is unlikely that the peripheral edge of the electrical steel sheet 40 is deformed to be locally turned over. Thus, deformation of the electrical steel sheet 40 is unlikely to occur even when adhesion to the peripheral edge of the electrical steel sheet 40 is not performed. Therefore, even when the non-adhesion region 43 is formed on the peripheral edge of the electrical steel sheet 40 as in the stator core 21 according to the first modified example shown in FIG. 5, the deformation of the electrical steel sheet 40 can be curbed. It is possible to curb the application of unnecessary strain to the electrical steel sheet 40 by forming the non-adhesion region 43 in this way. Therefore, the magnetic properties of the stator core 21 can be further ensured. When considering the work hardening due to the strain generated during the above-described punching process, a width of the non-adhesion region 43 is preferably equal to or less than the plate thickness of the electrical steel sheet 40.

The technical scope of the present invention is not limited to the above-described embodiment, and various modifications can be made without departing from the purpose of the present invention.

The shape of the stator core is not limited to the form shown in the above-described embodiment. Specifically, the dimensions of an outer diameter and an inner diameter of the stator core, the stacking thickness, the number of slots, the dimensional ratio between the circumferential direction and the radial direction of the tooth part 23, the dimensional ratio in the radial direction between the tooth part 23 and the core back part 22, and the like can be arbitrarily designed according to the desired properties of the electric motor.

Figure 6:
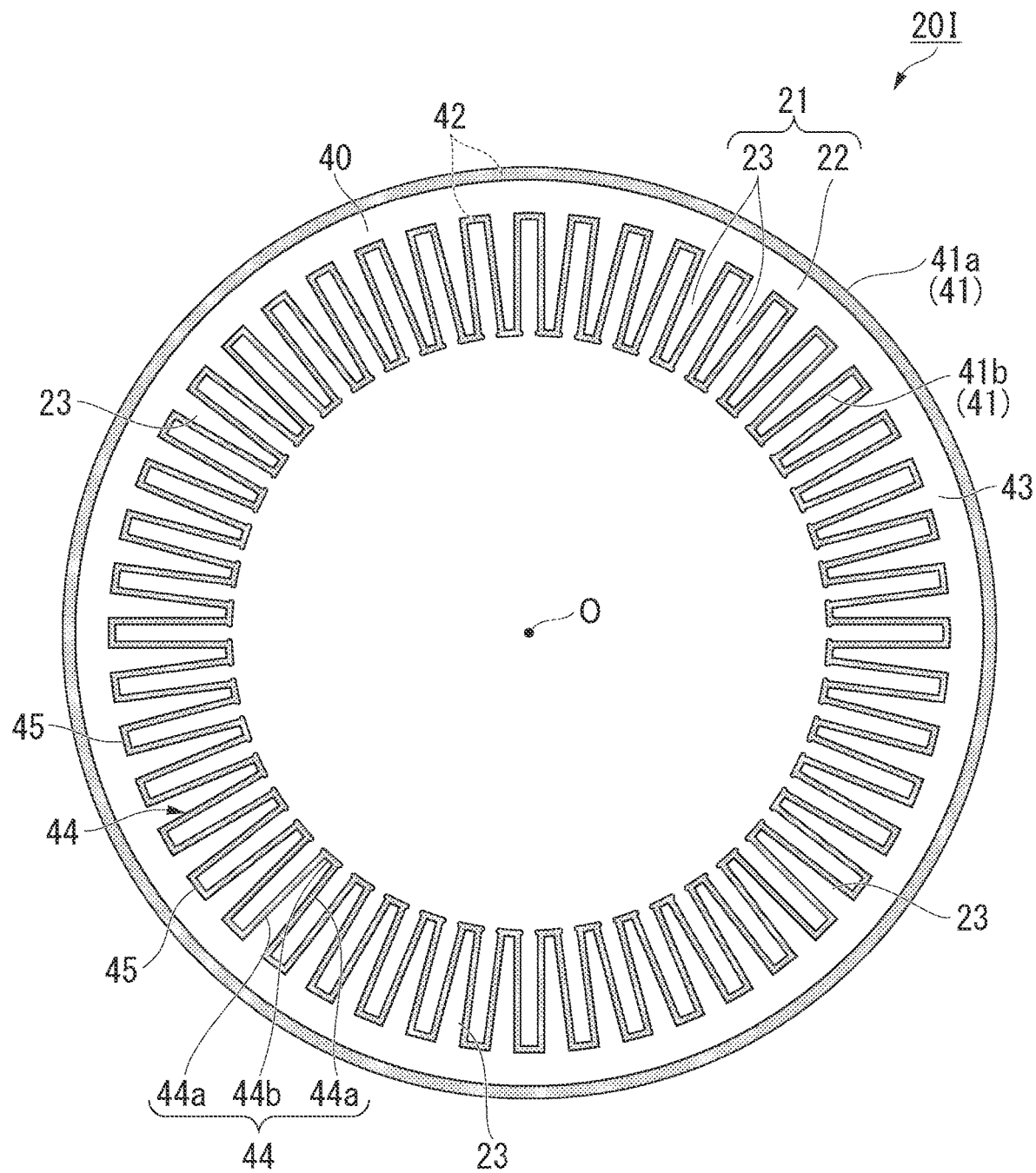
FIG. 6 is a plan view of an electrical steel sheet and an adhesion part of a stator included in an electric motor according to a second modified example of the electric motor shown in FIG. 1.
Figure 7:
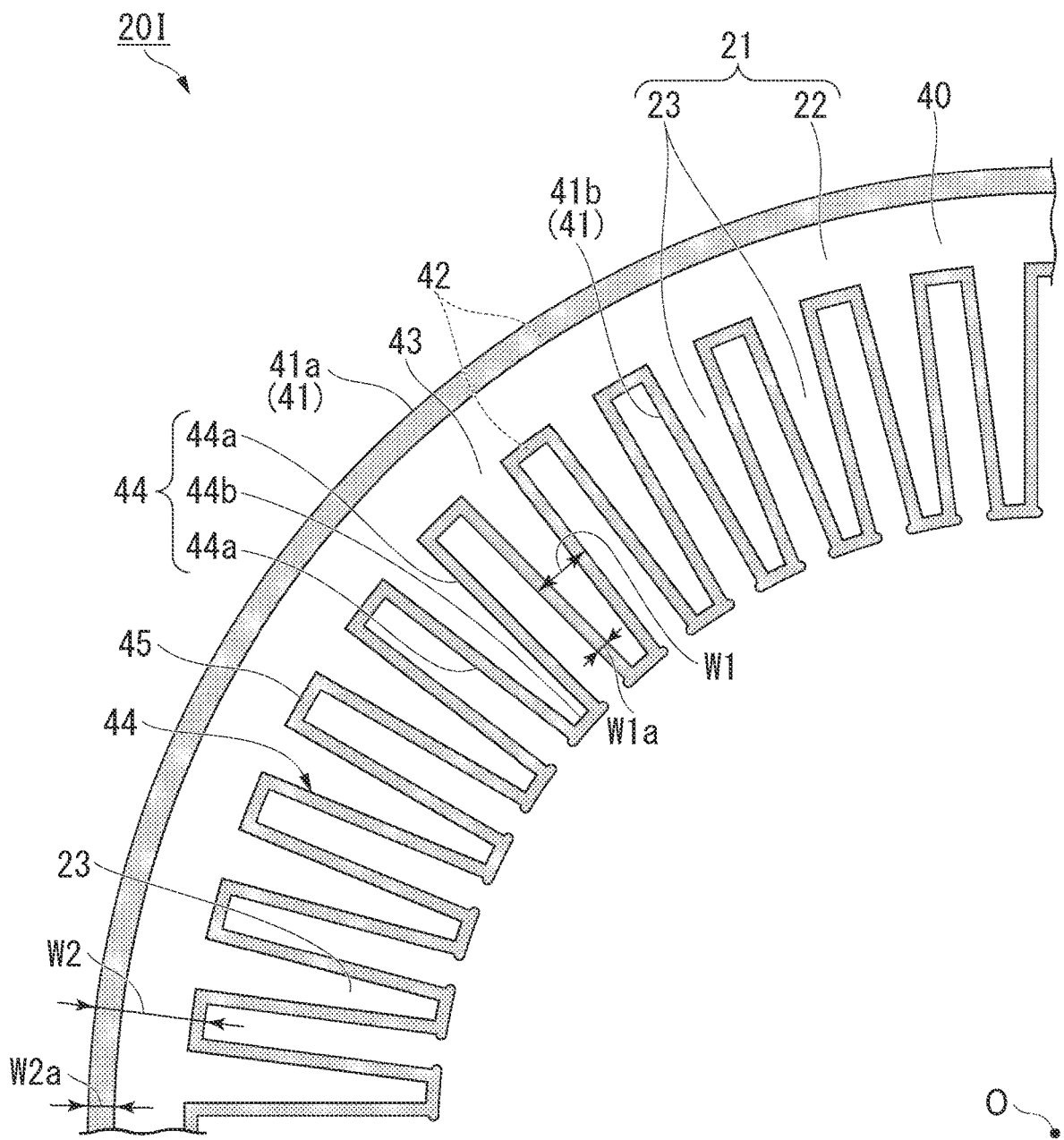
FIG. 7 is an enlarged view of the stator shown in FIG. 6.
Figure 8:
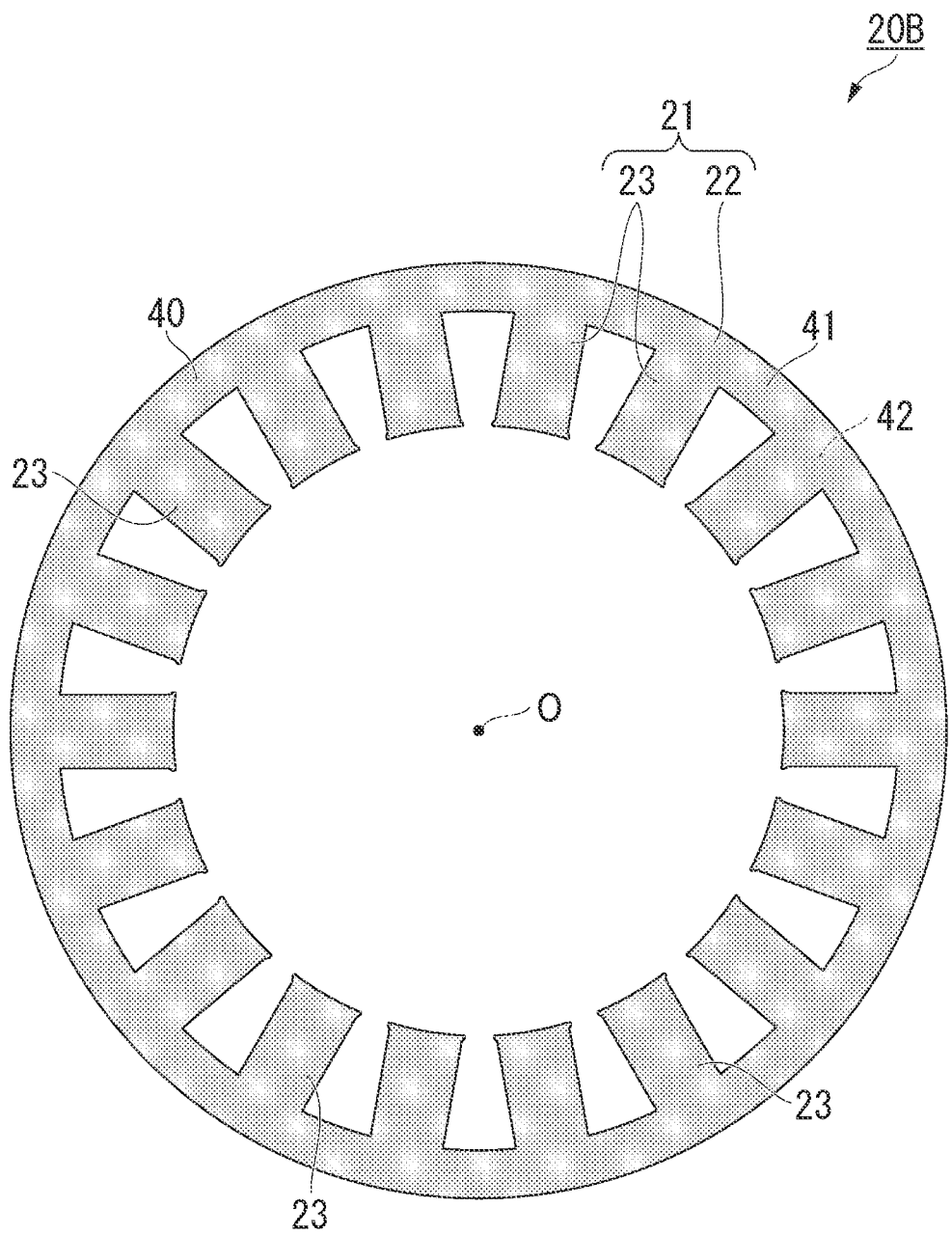
FIG. 8 is a plan view of an electrical steel sheet and an adhesion part of a stator which is a simulation target of iron loss in a verification test, and is a plan view showing a state in which an adhesion area ratio is 100%.
Figure 9:
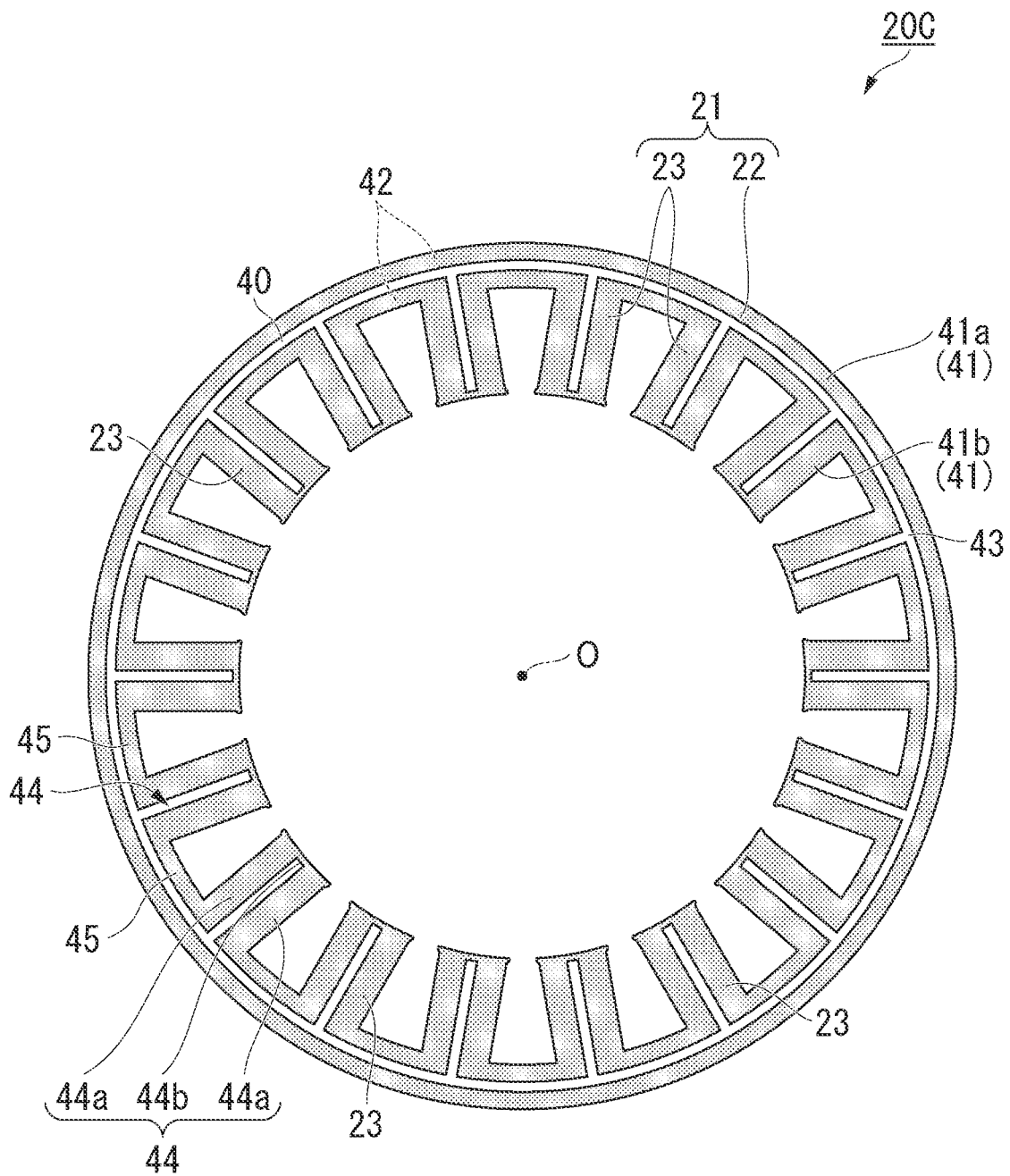
FIG. 9 is a plan view of an electrical steel sheet and an adhesion part of a stator which is the simulation target of iron loss in the verification test, and is a plan view showing a state in which the adhesion area ratio is 80%.
Figure 10:
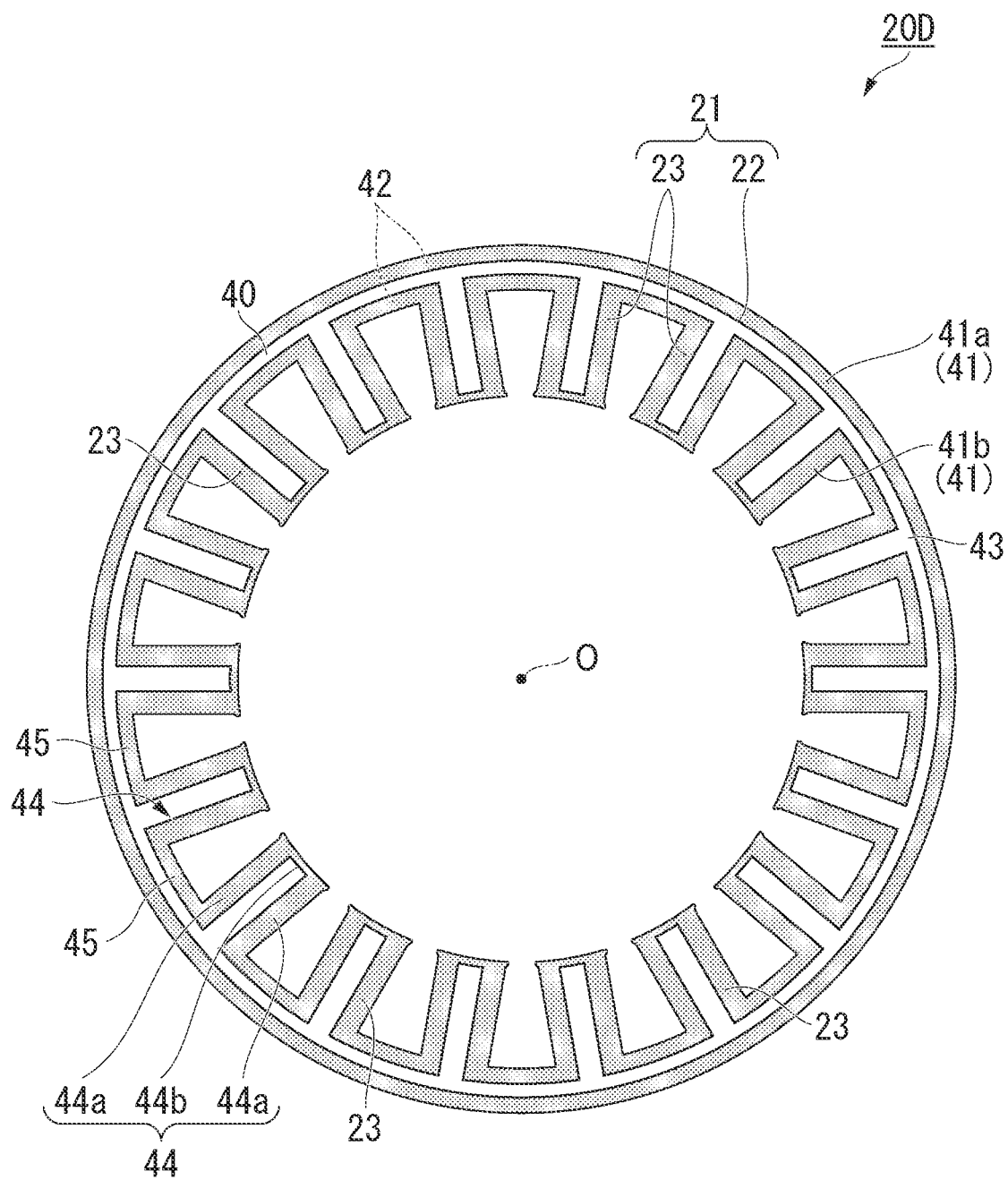
FIG. 10 is a plan view of an electrical steel sheet and an adhesion part of a stator which is the simulation target of iron loss in the verification test, and is a plan view showing a state in which the adhesion area ratio is 60%.
Figure 11:
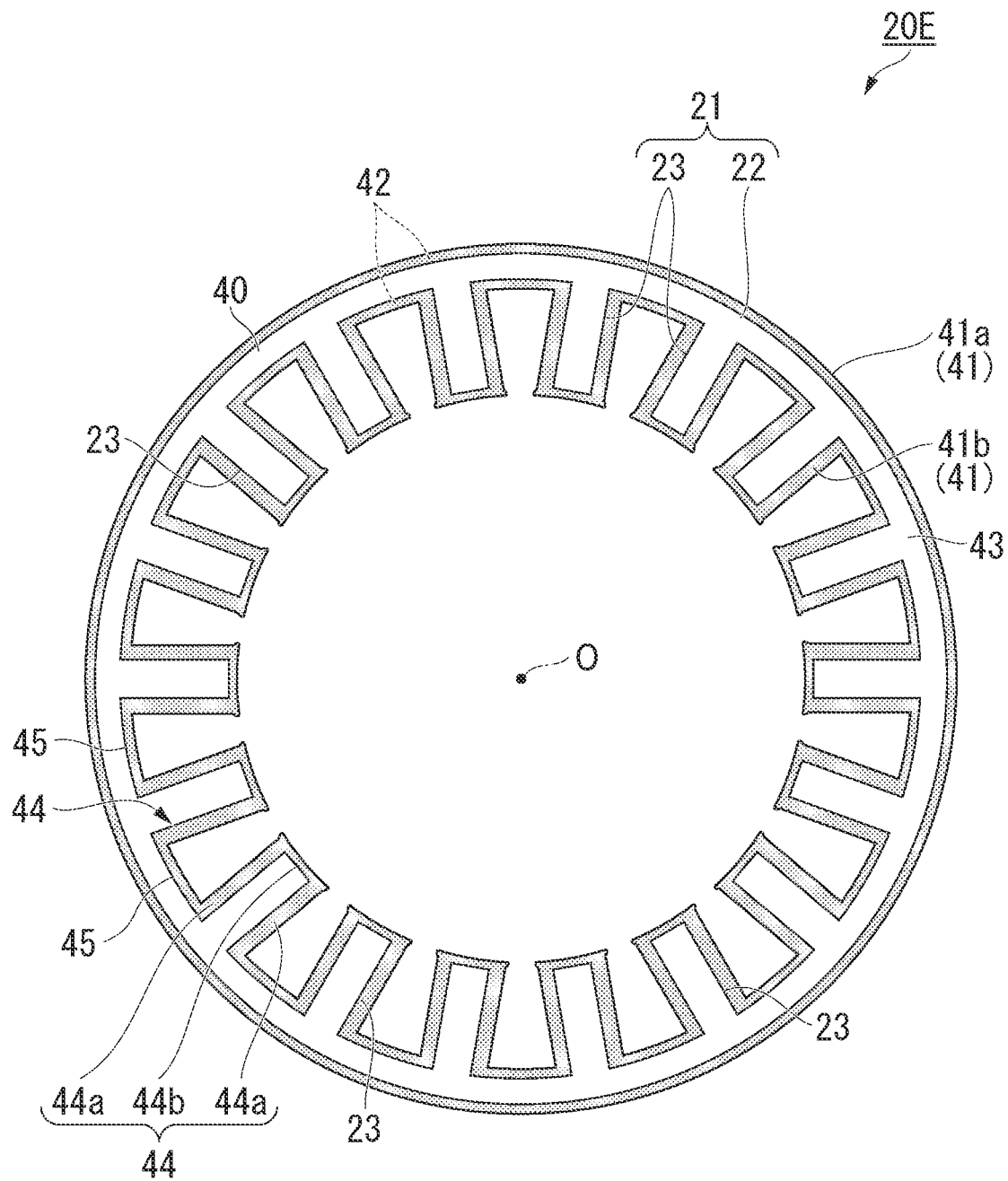
FIG. 11 is a plan view of an electrical steel sheet and an adhesion part of a stator which is the simulation target of iron loss in the verification test, and is a plan view showing a state in which the adhesion area ratio is 40%.
Figure 12:
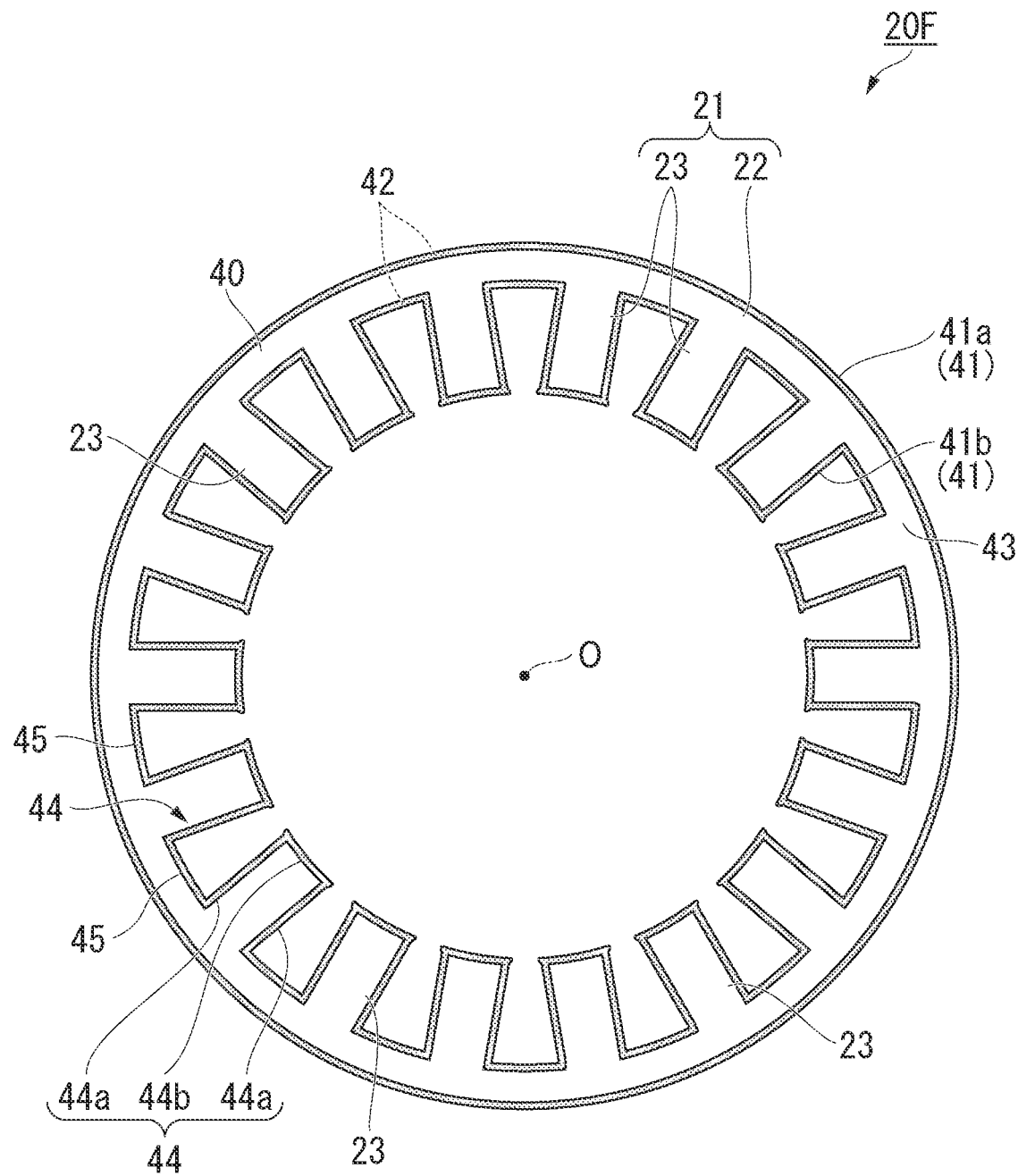
FIG. 12 is a plan view of an electrical steel sheet and an adhesion part of a stator which is the simulation target of iron loss in the verification test, and is a plan view showing a state in which the adhesion area ratio is 20%.
Figure 13:
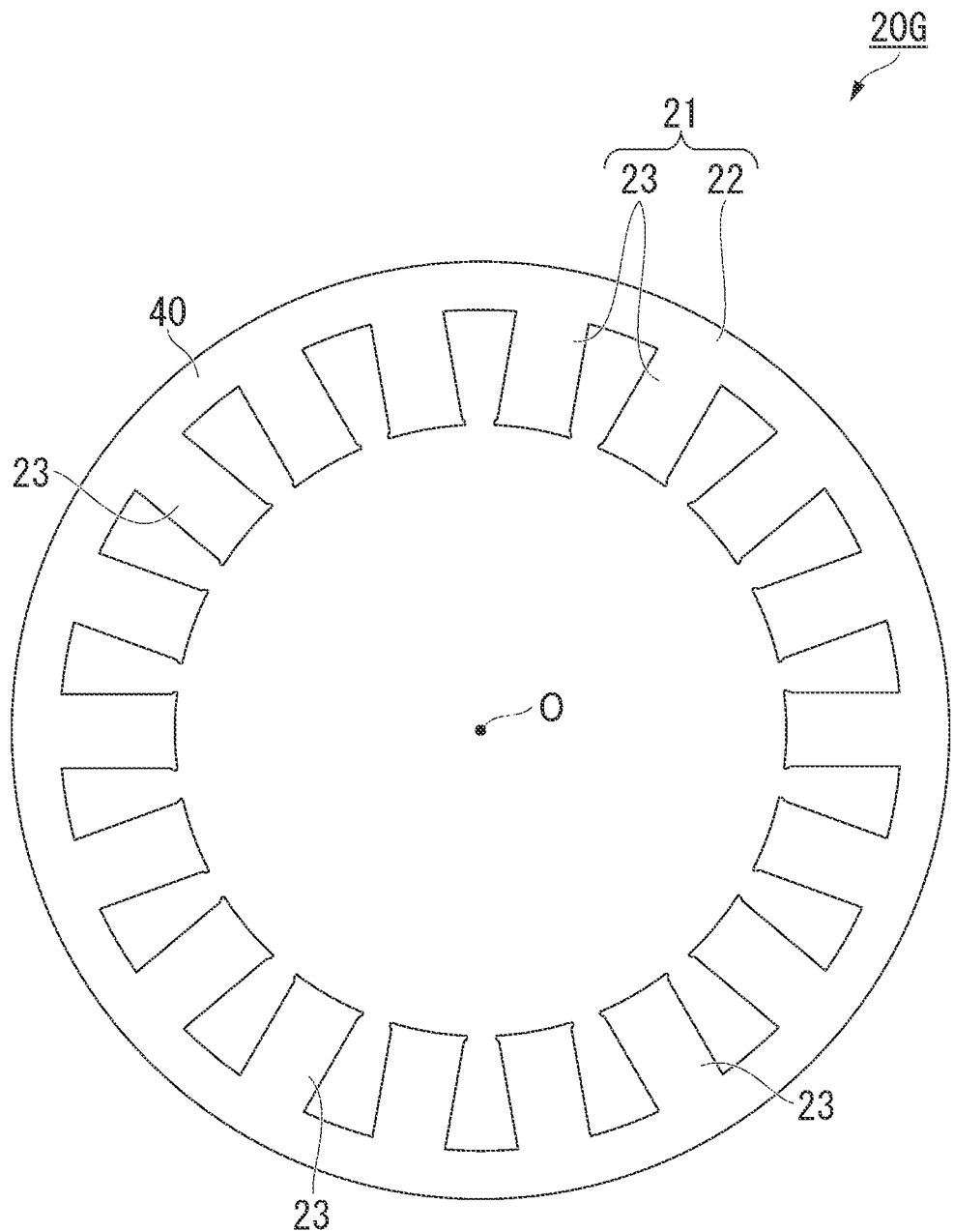
FIG. 13 is a plan view of an electrical steel sheet and an adhesion part of a stator which is the simulation target of iron loss in the verification test, and is a plan view showing a state in which the adhesion area ratio is 0%.
Figure 14:
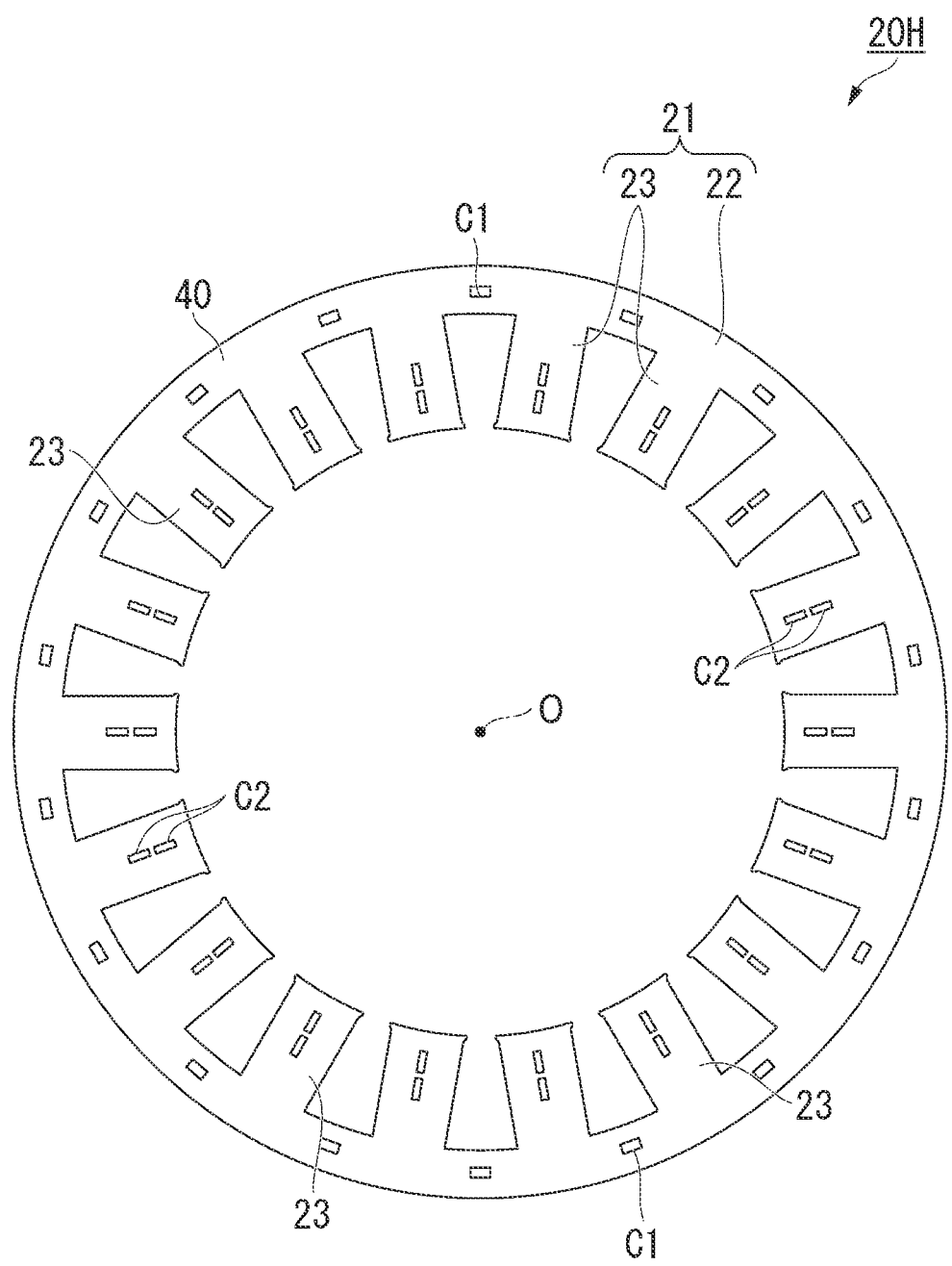
FIG. 14 is a plan view of an electrical steel sheet of a stator which is the simulation target of iron loss in the verification test, and is a plan view showing a state in which the electrical steel sheet is fastened and joined.

For example, the number of tooth parts 23 may be large, as in a stator 20I according to a second modified example shown in FIGS. 6 and 7. Such a stator 20I can be suitably adopted in a form in which the windings are wound in a distributed manner. When the windings are wound in a distributed manner, the width W1 of the tooth part 23 tends to be narrower than the case in which the windings are wound concentratedly.

Here, a ratio of a width W2a of a portion (the first adhesion part 41a itself in the present embodiment) of the first adhesion part 41a provided along the outer peripheral edge of the core back part 22 to a width W2 of the core back part 22 is referred to as a first ratio.

Both the widths W2 and W2a in obtaining the first ratio mean an average value of each of the widths. The width W2 of the core back part 22 when the first ratio is obtained can be, for example, an average value of widths of three points at equal intervals in the circumferential direction in the core back part 22 (three points every 120 degrees around the central axis O). Further, the width W2a of the first adhesion part 41a when the first ratio is obtained can be, for example, an average value of the widths of the three points of the first adhesion part 41a at equal intervals in the circumferential direction (the three points every 120 degrees around the central axis O).

A ratio of a width W1a of a portion of the second adhesion part 41b provided along a side edge of the tooth part 23 to the width W1 of the tooth part 23 is referred to as a second ratio. The side edge of the tooth part 23 is a portion of the peripheral edge of the tooth part 23 which faces the circumferential direction. The portion of the second adhesion part 41b provided along the side edge of the tooth part 23 is the first part 44a of the tooth part 44.

Both the widths W1 and W1a in obtaining the second ratio mean an average value of each of the widths.

The width W1 of the tooth part 23 when the second ratio is obtained can be, for example, an average value of widths of three points at equal intervals in the radial direction in the tooth part 23. These three points may be, for example, three points including an inner edge of the tooth part 23 in the radial direction, an inner edge of the tooth part 23 in the radial direction, and a center of the tooth part 23 in the radial direction.

Further, the width W1a of the first part 44a when the second ratio is obtained can be, for example, the average value of the widths at each of the three points at equal intervals in the radial direction in the first part 44a. The three points may be, for example, three points including an inner edge of the first part 44a (the tooth part 23) in the radial direction, an inner edge of the first part 44a (the tooth part 23) in the radial direction, and a center of the first part 44a (the tooth part 23) in the radial direction.

Such a second ratio is defined for each of the tooth parts 23. In the present embodiment, the second ratios for all the tooth parts 23 are the same. Here, the fact that the second ratios for all the tooth parts 23 are the same includes a case in which the second ratios for the tooth parts 23 are different, but a difference therebetween is small. When the difference is small, for example, the second ratio for each of the tooth parts 23 is included in a range within +5% with respect to the average value of the second ratios. In this case, the second ratios for all the tooth parts 23 mean an average value of the second ratio for each of the tooth parts 23.

In the stator 20I, the first ratio is 33% or less. Moreover, in the illustrated example, the first ratio is 5% or more.

Further, in the stator 20I, the second ratio is 10% or less. Moreover, in the illustrated example, the second ratio is 5% or more. In the present embodiment, the second ratios for all the tooth parts 23 are 10% or less and 5% or more.

In the stator 20I, the first ratio is equal to or greater than the second ratio.

The first ratio is 33% or less, and the second ratio is 10% or less. When both of the ratios are large, the adhesion area ratio becomes large. Therefore, the adhesion area ratio can be reduced to an appropriate value or less, for example, 40% or less by keeping both the ratios appropriately small.

Here, even when one of the first ratio and the second ratio is extremely high (for example, more than 50%), and the other is extremely low (for example, 0%), the adhesion area ratio itself may be curbed to an appropriate value or less. However, in this case, there is a likelihood that adhesion may be locally insufficient at the core back part 22 or the tooth part 23.

On the other hand, in the stator core 21, the first ratio and the second ratio are below a certain value, and one of the ratios is not extremely high. Therefore, it is possible to easily ensure the adhesion strength in each of the core back part 22 and the tooth part 23 while the adhesion area ratio is curbed to an appropriate value or less. For example, when both of the ratios are 5% or more, it is possible to easily ensure good adhesion strength in each of the core back part 22 and the tooth part 23.

In general, the shape of the tooth part 23 is restricted according to, for example, the number of poles and the number of slots. Thus, it is not easy to adjust the width W1 of the tooth part 23. On the other hand, the above-described restriction does not occur in the core back part 22, and the width W2 of the core back part 22 can be easily adjusted. Moreover, the core back part 22 needs to ensure strength for the stator core 21. Therefore, the width W2 of the core back part 22 tends to be wide.

Due to the above, it can be said that the width W2 of the core back part 22 tends to be wider than the width W1 of the tooth part 23. Therefore, the magnetic flux is widely dispersed in the core back part 22 in the width direction, and the magnetic flux density in the core back part 22 tends to be lower than the magnetic flux density in the tooth part 23. Therefore, even when the strain occurs in the electrical steel sheet 40 due to the adhesion part 41, and the strain occurs in the core back part 22, the influence on the magnetic properties becomes smaller than that when the strain occurs in the tooth part 23.

When the first ratio is equal to or greater than the second ratio, it can be said that the adhesion part 41 is unevenly distributed in the core back part 22 as compared with the tooth part 23. Here, as described above, when the strain occurs in the core back part 22, the influence on the magnetic properties is smaller than that when the stain occurs in the tooth part 23. Thus, the influence of the magnetic properties generated on the electrical steel sheet 40 can be curbed to be small while the adhesion area ratio is ensured by setting the first ratio to be equal to or greater than the second ratio.

In the rotor of the above-described embodiment, although a set of two permanent magnets 32 forms one magnetic pole, the present invention is not limited thereto. For example, one permanent magnet 32 may form one magnetic pole, or three or more permanent magnets 32 may form one magnetic pole.

In the above-described embodiment, although the permanent magnetic electric motor has been described as an example of the electric motor, the structure of the electric motor is not limited thereto as illustrated below, and various known structures not exemplified below can also be adopted.

In the above-described embodiment, although the permanent magnetic electric motor has been described as an example of the synchronous motor, the present invention is not limited thereto. For example, the electric motor may be a reluctance motor or an electromagnet field motor (a wound-field motor).

In the above-described embodiment, although the synchronous motor has been described as an example of the AC motor, the present invention is not limited thereto. For example, the electric motor may be an induction motor.

In the above-described embodiment, although the AC motor has been described as an example of the motor, the present invention is not limited thereto. For example, the electric motor may be a DC motor.

In the above-described embodiment, although the motor has been described as an example of the electric motor, the present invention is not limited thereto. For example, the electric motor may be a generator.

In the above-described embodiment, although the case in which the laminated core according to the present invention is applied to the stator core is exemplified, it can also be applied to the rotor core.

In addition, it is possible to replace the components in the above-described embodiment with well-known components as appropriate without departing from the spirit of the present invention, and the above-described modified examples may be appropriately combined.

Next, verification tests (a first verification test and a second verification test) for verifying the above-described operation and effects were carried out. This verification tests were carried out by simulation using software, except for a verification of the adhesion strength which will be described later. As the software, an electromagnetic field simulation software based on finite element method JMAG manufactured by JSOL Corporation was used.

(First Verification Test)

FIGS. 8 to 14 show stators 20B to 20G which were simulated in this verification test. In each of the stators 20B to 20G, the stator 20 according to the embodiment shown in FIGS. 1 to 4 was used as a basic structure, and the following points are changed with respect to the stator. That is, the plate thickness of the electrical steel sheet 40 was set to 0.25 mm or 0.20 mm. Additionally, as shown in FIGS. 8 to 13, in all the stators 20B to 20G having the two types of plate thicknesses, the adhesion area ratio of each of the electrical steel sheets 40 by the adhesion part 41 was made different from each other by 20% from 0% to 100% (12 types in total).

The iron loss of each of the electrical steel sheets 40 constituting the 12 types of stators 20B to 20O was obtained by the above-described simulation. Further, as a comparison target, as in the stator 20H shown in FIG. 14, the iron loss of the electrical steel sheet 40 in the stator 20H in which the plurality of electrical steel sheets 40 are all-fastened is also obtained. For the stator 20H to be compared, the iron loss was obtained for two types when the plate thickness was 0.25 mm or 0.20 mm. The stator 20H to be compared includes a plurality of fastenings C1 and C2. The fastenings C1 and C2 include a first fastening C1 provided on the core back part 22 and a second fastening C2 provided on the tooth part 23. A ratio of an area occupied by the fastenings C1 and C2 to the first surface of the electrical steel sheet 40 is about 3.2%.

Figure 15:
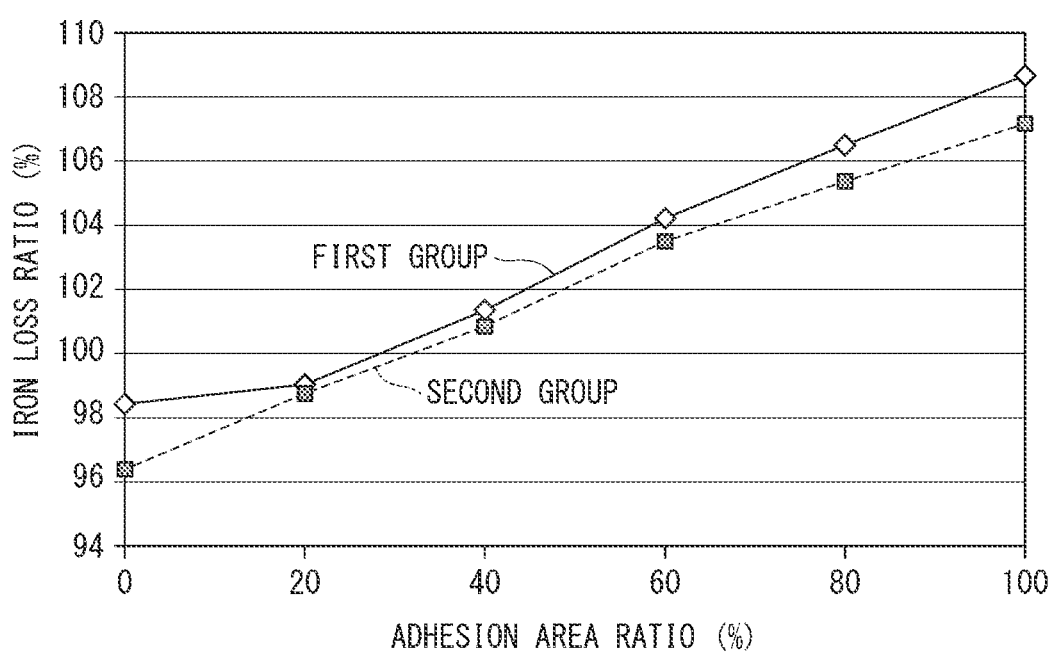
FIG. 15 is a graph showing results of the verification test.

The results are shown in a graph of FIG. 15. In the graph of FIG. 15, a horizontal axis is the adhesion area ratio of the electrical steel sheet 40 by the adhesion part 41. A vertical axis is a value (the iron loss ratio) obtained by dividing the iron loss of the electrical steel sheet 40 in each of the stators 20B to 20G by the iron loss of the electrical steel sheet 40 in the stator 20H to be compared (the stator 20H having the same plate thickness of the electrical steel sheet 40). When the iron loss of the electrical steel sheet 40 in each of the stators 20B to 20G is equivalent to the iron loss in the stator 20H to be compared, the iron loss ratio is about 100%. As the iron loss ratio becomes smaller, the iron loss of the electrical steel sheet 40 becomes smaller, and the magnetic properties of the stators 20B to 20G are excellent.

In the graph shown in FIG. 15, 12 types of stators 20B to 20G were divided into two groups, and the results of each of the groups were summarized as a line graph. The six stators 20B to 20G having a plate thickness of 0.25 mm of the electrical steel sheet 40 were designated as a first group, and the six stators 20B to 20G having a plate thickness of 0.20 mm of the electrical steel sheet 40 were designated as a second group.

From the graph shown in FIG. 15, it can be confirmed that the stators 20E to 20G in which the adhesion area ratio of the electrical steel sheet 40 by the adhesion part 41 is 40% or less have the iron loss equivalent to that of the stator 20H to be compared.

(Second Verification Test)

This verification test is a verification test for the first ratio and the second ratio. Each of the stators simulated in this verification test has the structure of the stator 20I according to the second modified example shown in FIGS. 6 and 7 as a basic structure.

In each of the stators, the first ratio and the second ratio were changed by changing the shape of the adhesion part 41 while keeping the shape of the electrical steel sheet 40 as it was. Specifically, the widths W1a and W2a of the adhesion part 41 were narrowed to change the first ratio and the second ratio. In each of the stators, the adhesion part 41 was disposed without a gap with respect to the peripheral edge of the electrical steel sheet 40.

Examples 1 to 3 and Comparative Example 1

In each of the stators of Examples 1 to 3 and Comparative example 1, the first ratio was fixed, and then the second ratio was changed. Then, the adhesion area ratio and the adhesion strength were confirmed for each of the stators.

Table 1 shows the results of values of the first ratio and the second ratio, the adhesion area ratio, and the adhesion strength for each of the stators of Examples 1 to 3 and Comparative example 1.

TABLE 1

|  | Example 1 | Example 2 | Example 3 | Comparative example 1 |
|---|---|---|---|---|
| First ratio (%) | 33 | 33 | 33 | 33 |
| Second ratio (%) | 5 | 7 | 10 | 13 |
| Adhesion area ratio (%) | 37 | 38 | 40 | 42 |
| Adhesion strength | Good | Excellent | Excellent | Excellent |

In Table 1, the adhesion strength was evaluated in a state in which a plurality of motors were manufactured by applying a winding into the slots after the stator core was manufactured. Five stator cores were manufactured for each of Examples. At that time, when none of the core back part and the tooth part was affected in all the five stator cores, that is, in both the core back part and the tooth part, when the stator core was not peeled off (the adhesion part was damaged, the electrical steel sheets adjacent to each other were peeled off), it was considered to be excellent. As a result of winding, in only one of the five stator cores, although the peeling-off of the stator core occurred in a part of the tooth part, it was evaluated as good when the shape of the tooth part was not affected at the time of completion of the winding. As a result of winding in two or more of the five stator cores, although the peeling-off of the stator core occurred at the tooth part, it was evaluated as acceptable when the shape of the tooth part was not affected at the time of completion of the winding. Other cases were evaluated as unacceptable.

In each of the stators of Examples 1 to 3 and Comparative example 1, the first ratio was set to 33%. Then, the second ratio was changed.

Due to the above results, when the first ratio is 33%, the adhesion area ratio is 40% even when the second ratio is 10% (Example 3). However, when the second ratio exceeded 10%, for example, 13% (Comparative example 1), it was confirmed that the adhesion area ratio exceeded 40%. Further, when the second ratio became 5% (Example 1), it was confirmed that there was a stator core in which the peeling-off of the tooth part had occurred and that the adhesion strength was slightly affected.

Examples 11 to 13 and Comparative Example 11

In each of the stators of Examples 11 to 13 and Comparative example 11, the second ratio was fixed and then the first ratio was changed. Then, the adhesion area ratio and the adhesion strength were confirmed for each of the stators.

Table 2 shows the results of the values of the first ratio and the second ratio, the adhesion area ratio, and the adhesion strength for each of the stators of Examples 11 to 13 and Comparative example 11.

TABLE 2

|  | Example 11 | Example 12 | Example 13 | Comparative example 11 |
| --- | --- | --- | --- | --- |
| First ratio (%) | 4.9 | 6.6 | 33 | 36 |
| Second ratio (%) | 10 | 10 | 10 | 10 |
| Adhesion area ratio (%) | 12 | 13 | 40 | 43 |
| Adhesion strength | Good | Excellent | Excellent | Excellent |

In Table 2, the evaluation criteria for the adhesion strength were the presence or absence of the peeling-off of upper and lower surfaces of the stator core caused by the contact between the stator and the case when the stator was inserted into the case after the stator was manufactured, and the degree of peeling-off. Five stators were manufactured for each of Examples. At the time of inserting the stator into the case, when none of the core back part and the tooth part was affected in all the five stators, that is, in both the core back part and the tooth part, when the stator core was not peeled off (the adhesion part was damaged, the electrical steel sheets adjacent to each other were peeled off), it was considered to be excellent. At the time of the insertion, in only one of the five stators, although the peeling-off of the stator core occurred in a part of the core back part, it was evaluated as good when the shape of the core back part was not affected at the time of completion of the insertion. At the time of the insertion, in two or more of the five stators, a case in which the peeling-off of the stator core occurred at the tooth part and the shape of the core back part was not affected at the time of the completion of the insertion was evaluated as acceptable. Other cases were evaluated as unacceptable.

In each of the stators of Examples 11 to 13 and Comparative example 11, the second ratio was set to 10%. Then, the first ratio was changed.

Due to the above results, when the second ratio was 10%, the adhesion area ratio is 40% even when the second ratio was 33% (Example 13). However, when the first ratio exceeded 33%, for example 36% (Comparative example 11), it was confirmed that the adhesion area ratio exceeded 40%. Further, when the first ratio became 4.9% (Example 11), and the stator was inserted into the case, it was confirmed that the upper surface of the core back part was peeled off in some of the stators, and thus the adhesion strength was slightly affected.

Example 21

In the stator of Example 21, the first ratio was 6.6%, and the second ratio was 7%. When the adhesion area ratio in this stator was confirmed, it was 12%.

INDUSTRIAL APPLICABILITY

According to the present invention, it is possible to improve the magnetic properties. Therefore, the industrial applicability is great.

BRIEF DESCRIPTION OF THE REFERENCE SYMBOLS

10 Electric motor
21 Stator core (laminated core)
22 Core back part
23 Tooth part
40 Electrical steel sheet
41 Adhesion part
42 Adhesion region
43 Non-adhesion region

The invention claimed is:
1. A laminated core comprising:
electrical steel sheets stacked on each other, each electrical steel sheet being-coated with an insulation coating on both surfaces thereof; and
an adhesion part provided between each of the electrical steel sheets adjacent to each other in a stacking direction and configured to adhere the electrical steel sheets to each other,
wherein an adhesion area ratio of each electrical steel sheet by the adhesion part is 1% or more and 40% or less,
each electrical steel sheet includes an annular core back part and a plurality of tooth parts which protrude from the annular core back part in a radial direction of the annular core back part and are disposed at intervals in a circumferential direction of the annular core back part,
the adhesion part includes a second adhesion part provided along an inner peripheral edge of the electrical steel sheet,
the second adhesion part includes a plurality of adhesion tooth parts and a plurality of adhesion core back parts,
the plurality of adhesion tooth parts are provided at intervals in the circumferential direction, and are respectively disposed in the plurality of tooth parts of the electrical steel sheet, and
the plurality of adhesion core back parts are disposed in the annular core back part of the electrical steel sheet, and connect the plurality of adhesion tooth parts that are adjacent to each other in the circumferential direction.

2. The laminated core according to claim 1, wherein the adhesion area ratio is 1% or more and 20% or less.

3. The laminated core according to claim 1, wherein a non-adhesion region of the electrical steel sheet in which the adhesion part is not provided is formed between an adhesion region of the electrical steel sheet in which the adhesion part is provided and the inner peripheral edge of the electrical steel sheet.

4. The laminated core according to claim 3, wherein the adhesion part includes a first adhesion part provided along an outer peripheral edge of the electrical steel sheet, and
the non-adhesion region of the electrical steel sheet is formed between the adhesion region of the electrical steel sheet in which the first adhesion part is provided and the outer peripheral edge of the electrical steel sheet.

5. The laminated core according to claim 3, wherein the non-adhesion region of the electrical steel sheet is formed between the adhesion region of the electrical steel sheet in which the second adhesion part is provided and the inner peripheral edge of the electrical steel sheet.

6. The laminated core according to claim 1, wherein an adhesion area of the annular core back part by the adhesion part is equal to or larger than an adhesion area of the plurality of tooth parts of the electrical steel sheet by the adhesion part.

7. The laminated core according to claim 1, wherein
the adhesion part includes a first adhesion part provided along an outer peripheral edge of the electrical steel sheet,
a first ratio which is a ratio of a width of a portion of the first adhesion part provided along the outer peripheral edge of the annular core back part to a width of the annular core back part is 33% or less, and
a second ratio which is a ratio of a width of a portion of the second adhesion part provided along a side edge of a tooth part of the electrical steel sheet included in the plurality of tooth parts to a width of the tooth part of the electrical steel sheet is 10% or less.

8. The laminated core according to claim 7, wherein the first ratio is 5% or more, and the second ratio is 5% or more.

9. The laminated core according to claim 7, wherein the first ratio is equal to or greater than the second ratio.

10. The laminated core according to claim 1, wherein an average thickness of the adhesion part is 1.0 μm to 3.0 μm.

11. The laminated core according to claim 1, wherein an average tensile modulus of elasticity E of the adhesion part is 1500 MPa to 4500 MPa.

12. The laminated core according to claim 1, wherein the adhesion part is a room temperature adhesion type acrylic-based adhesive containing SGA made of an elastomer-containing acrylic-based adhesive.

13. An electric motor comprising the laminated core according to claim 1.

* * * * *